US012755452B2

(12) United States Patent
Kumar et al.

(10) Patent No.: US 12,755,452 B2
(45) Date of Patent: Oct. 6, 2026

(54) GENERATING ASSISTIVE GUIDES OF CANDIDATE PATHS IN AN IMAGE FOR USER TRACING INPUTS

(71) Applicant: Adobe Inc., San Jose, CA (US)

(72) Inventors: Harish Kumar, Noida (IN); Apurva Kumar, Bangalore (IN); Aditya Nellutla, Bangalore (IN)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 18/670,383

(22) Filed: May 21, 2024

(65) Prior Publication Data

US 2025/0363684 A1 Nov. 27, 2025

(51) Int. Cl.

| | |
|---|---|
| ***G06T 11/23*** | (2026.01) |
| ***G06T 5/30*** | (2006.01) |
| ***G06T 7/11*** | (2017.01) |
| ***G06T 7/12*** | (2017.01) |
| ***G06T 7/136*** | (2017.01) |

(52) U.S. Cl.

CPC ................ *G06T 11/23* (2026.01); *G06T 5/30* (2013.01); *G06T 7/11* (2017.01); *G06T 7/12* (2017.01); *G06T 7/136* (2017.01); *G06T 2200/24* (2013.01); *G06T 2210/12* (2013.01)

(58) Field of Classification Search

None

See application file for complete search history.

(56) References Cited

U.S. PATENT DOCUMENTS

| | | | | |
|---|---|---|---|---|
| 10,930,033 | B1 | 2/2021 | Peterson | |
| 2019/0371008 | A1 | 12/2019 | Peterson | |
| 2020/0117347 | A1* | 4/2020 | Voliter | G06T 11/60 |
| 2021/0357113 | A1* | 11/2021 | Mangu | G06F 3/04842 |
| 2022/0114698 | A1* | 4/2022 | Liu | G06T 3/04 |
| 2022/0198671 | A1* | 6/2022 | Price | G06N 3/045 |
| 2023/0154075 | A1* | 5/2023 | Tailang | G06T 11/23 345/442 |
| 2023/0277249 | A1* | 9/2023 | Bork | A61B 34/20 600/424 |

OTHER PUBLICATIONS

Search Report as received in United Kingdom Application No. 2502115.5 dated Sep. 16, 2025.

(Continued)

*Primary Examiner* — James A Thompson

(74) *Attorney, Agent, or Firm* — Keller Preece PLLC

(57) ABSTRACT

The present disclosure is directed toward systems, methods, and non-transitory computer readable media that provide assistive guides for path tracing of raster images. In particular, in one or more implementations, the disclosed systems determine a set of outlines corresponding to boundaries of a set of segments within a raster image. The disclosed systems select, from the set of outlines, an outline corresponding to a segment in response to a client device input indicating point(s) located within a threshold distance of the outline. The disclosed systems provide, for display within a graphical user interface of a client device, a highlighted indication of the outline corresponding to the segment. The disclosed systems generate, within a vector image, a vector path based on the outline corresponding to the segment in response to a selection of the outline via the graphical user interface.

20 Claims, 15 Drawing Sheets

(56) References Cited

OTHER PUBLICATIONS

Alexander Kirillov et al. "Segment Anything". Computer Vision and Pattern Recognition, arXiv preprint arXiv: 2304.02643v1, Apr. 5, 2023.
Roland T Chin et al. "On the Detection of Dominant Points on Digital Curves". IEEE Transactions on Pattern Analysis and Machine Intelligence 11(8):859-872. (1989).
Satoshi Suzuki. "Topological Structural Analysis of Digitized Binary Images by Border Following". Computer Vision, Graphics, And Image Processing 30, 32-46 (1985).

* cited by examiner

GENERATING ASSISTIVE GUIDES OF CANDIDATE PATHS IN AN IMAGE FOR USER TRACING INPUTS

BACKGROUND

Advancements in computing devices and computer design applications have led to innovative developments in computer image design and editing software. For example, certain computer design applications allow for editing and manipulating of digital images utilizing vector paths, such as Bézier curves, to generate a diverse range of graphical representations with lossless scaling. However, converting content from raster images into vector images, which includes the translation of image data into mathematical outlines, is a complex procedure that often depends on the resolution quality of the raster images. Unfortunately, current vector-based applications are limited by their ability to interpret the complexities of pixel-based information when converting the details of a raster image into vector content and frequently involves manual conversion of the raster image into vector content. Existing image editing systems have a number of shortcomings with regard to flexibility and operational efficiency when tracing, editing, and generating vector paths from raster images.

SUMMARY

One or more embodiments provide benefits and/or solve one or more of the foregoing or other problems in the art with systems, methods, and non-transitory computer readable storage media that provide a graphical user interface and processes tailored to streamline object tracing within vector-based design applications via assistive guides. In particular, the disclosed systems utilize deep learning to semantically analyze raster images and perform segmentation to generate object masks for segments within the raster images. The disclosed systems generate outlines for the segments utilizing the images masks of the segments. Further, the disclosed systems employ an outline matching model with hit detection to match client device input to the generate outlines corresponding to user intent. In addition, the disclosed systems provide suggestions of possibly matching outlines as assistive guides within a graphical user interface while adapting the assistive guides to changes in the client device input in real time. The disclosed systems also generate vector paths in response to a selection of an outline from the suggested outlines.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
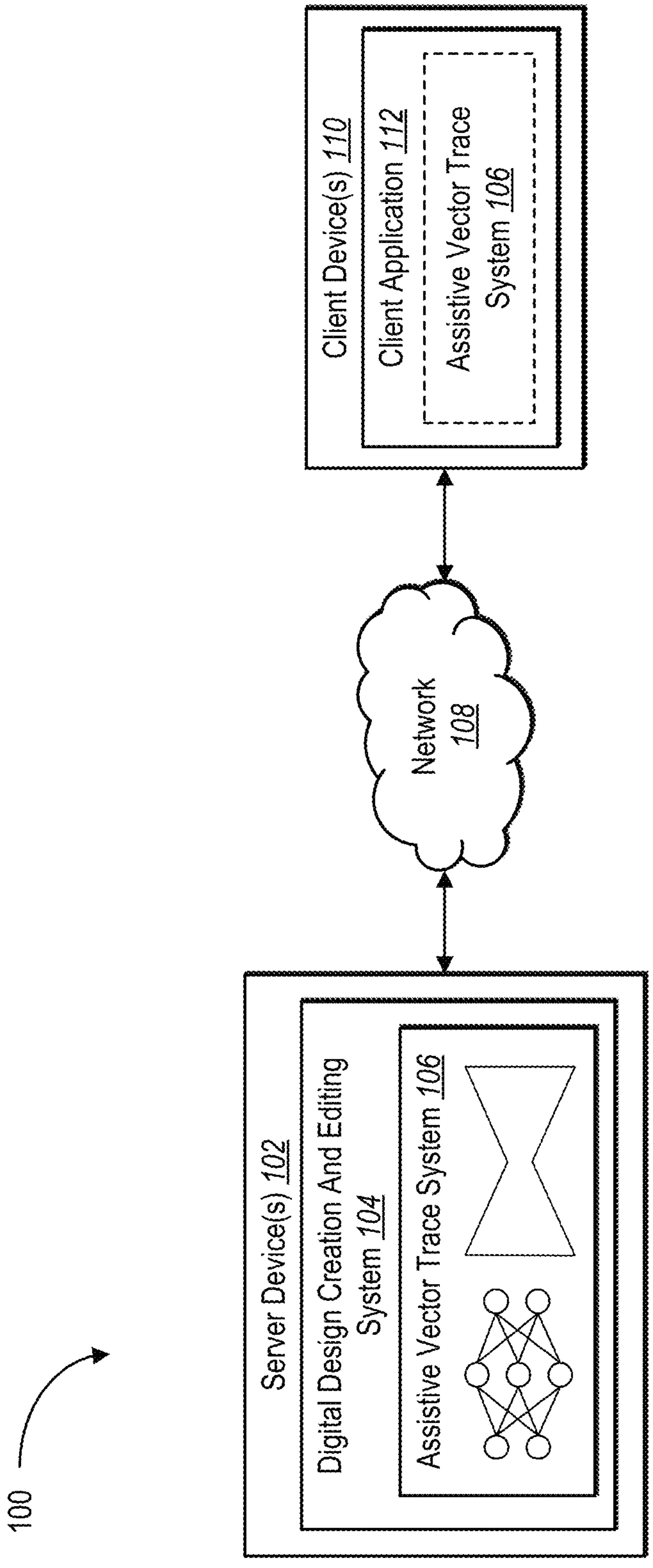
FIG. 1 illustrates a schematic diagram of an example environment of an assistive vector trace system in accordance with one or more embodiments.

This disclosure describes one or more embodiments of an assistive vector trace system that provide a graphical user interface tailored to streamline object tracing within vector-based design applications via assistive guides. In particular, in one or more implementations, the assistive vector trace system utilizes deep learning to semantically analyze raster images and perform segmentation to generate object masks for segments within the raster images. In addition, the assistive vector trace system generates outlines utilizing the images masks of the segments. Further, the assistive vector trace system employs an outline matching model with hit detection to match client device input to the generated outlines corresponding to user intent. In addition, the assistive vector trace system provides suggestions of possibly matching outlines as assistive guides within a graphical user interface while adapting the assistive guides to changes in client device input in real time. The assistive vector trace system also generates vector paths in response to a selection of an outline from the suggested outlines.

More specifically, in one or more implementations, the assistive vector trace system determines a set of outlines corresponding to the boundaries of a set of segments (e.g., segmented objects) within a raster image. For example, the assistive vector trace system employs a combination of an object detection model (e.g., a deep neural network image segmentation model) and a segmentation model to determine detailed segments within a source raster image. In particular, in some embodiments, the assistive vector trace system utilizes the object detection model to generate object masks that delineate semantic objects within the image. Further, in certain embodiments, the assistive vector trace system utilizes the segmentation model to generate a set of segment masks for more detailed segmentations of one or more of the semantic objects within the image based on the object masks.

In certain embodiments, the assistive vector trace system converts one or more of the segment masks into outlines. For example, to generate the outlines, the assistive vector trace system applies a thresholding technique to a segment mask to generate a binary mask. Further, the assistive vector trace system extracts contour lines, which demarcate the boundaries of segments within the segment mask. In some cases, the assistive vector trace system approximates the contours to reduce the number of anchor points. In turn, in one or more embodiments, the assistive vector trace system generates outlines by creating polylines corresponding to the contours of the segment masks.

As mentioned, in one or more embodiments, the assistive vector trace system selects one or more outlines (e.g., a set of outlines as candidate outlines) corresponding to client device input. For example, the assistive vector trace system receives a client device input indicating one or more points corresponding to a path input (e.g., partial Bézier curve, input spline, point, line primitive) in the input image. In some cases, the assistive vector trace system filters the outlines corresponding to the segment masks utilizing hit detection involving bounding boxes of the client device input and the outlines. In certain embodiments, the assistive vector trace system performs vector component detection by flattening the client device input and the filtered set of outlines into corresponding line primitives. Based on a comparison of the line primitives for the path input and the restricted set of outlines, the assistive vector trace system selects one or more outlines that match the path input as potential outlines.

Furthermore, in certain embodiments, the assistive vector trace system automatically completes the client device input by generating a vector path (e.g., a Bézier curve) that completes the outline of a segment within the input image. For instance, the assistive vector trace system highlights the potential outlines on the client device to visually indicate matched outlines that correspond to the path input. Upon receiving a client device input selecting one of the highlighted outlines, the assistive vector trace system autocompletes a vector path by generating a Bézier curve corresponding to the geometry of the selected highlighted outline and incorporating (or otherwise matching) the client device input.

As described above, the assistive vector trace system overcomes shortcomings of conventional systems that provide tools for vectorizing raster images. Specifically, conventional systems have a number of technical shortcomings with regard to flexibility and computational efficiency when tracing raster images to generate vector outlines. For example, many existing design systems inflexibly provide image tracing utilizing only conventional drawing tools, which requires users to manually execute a precise drawing of each desired path based on the source image. Furthermore, when generating Bézier curves to trace intricate/detailed images, existing design systems do not provide real time contextual feedback to the client device, often resulting in users needing to perform multiple tracing iterations or attempts to accurately generate a vector path and/or a high proficiency with the tools.

In addition, although some design systems provide the ability to automatically trace images using conversion tools, these conversion tools are often inflexible. For example, many the accuracy of existing conversion tools are highly dependent on a resolution of the input raster and often create an overtly complex vector output that includes unnecessary and/or incorrect details. Notably, these excess details often require users to perform a cleaning process before integrating the output into subsequent workflows. Furthermore, existing conversion tools are often complicated and require users to manually choose, filter, and integrate the individual outlines to obtain the vector form of the intended portion of the raster image. Indeed, conversion tools of existing design systems are often cumbersome, which significantly hinders the flexibility and/or adaptability of existing design systems when automating tracing images.

Relatedly, many existing design systems are operationally inefficient because of their reliance on significant manual input. To illustrate, with many existing design systems, users must manually select, trace, and correct the vector paths by generating and interacting with many points (e.g., control points), which is resource-consuming and labor-intensive. Furthermore, although some design systems provide automated tracing features, the automated tracing features are often highly dependent on the resolution of the raster image and do not capture the nuances of the raster image accurately. This lack of precision necessitates additional manual correction to achieve the desired level of detail, contributing to the operational inefficiencies. In addition, many automated tracing features do not provide the ability to partially vectorize a raster image (e.g., a single vector path) and thus require manual editing to select individual vector paths from the entire vectorized image. In addition, the interfaces of some conversion tools are complex and not intuitive, leading to a steep learning curve, which slows down the conversion process, especially for users who are not familiar with the vector-based design application.

As suggested above, embodiments of the assistive vector trace system provide a variety of advantages over conventional design systems. For example, one or more embodiments of the assistive vector trace system improve operational flexibility in comparison to conventional design systems. Unlike existing conversion tools that rely on significant manual editing of paths and path points, the assistive vector trace system provides assistive guides with autocompletion of vector paths without requiring the user to draw a complete curve. For example, based on a selection of an outline from a set of potential outlines corresponding to a client device input, the assistive vector trace system automatically generates a completed vector path corresponding to the geometry of the selected outline. Furthermore, unlike existing automated tools, the assistive vector trace system provides the ability to partially vectorize a raster image. In addition, the assistive vector trace system provides contextual feedback in real time by adding or removing the display of assistive guides representing potential highlighted outlines as a client device input is modified.

In addition, in one or more embodiments, the assistive vector trace system provides a streamlined process that enhances operational efficiency. For example, in contrast to the complex user interfaces of existing design systems, the assistive vector trace system reduces the complexity of image tracing by providing a straightforward user interface that reacts to a client device input based on content extracted from a raster image. In particular, the assistive vector trace system provides an intuitive method for users to interact with raster images, provides contextual feedback to assist in tracing workflow, and automatically completes vector paths based on client device input.

For example, rather than requiring users to manually draw individual outlines that represent the intended portion of the raster image, the assistive vector trace system provides assistive guides to highlight a selection of potential outlines associated with a client device input (e.g., a partial Bézier curve). In particular, based on one or more points drawn in a graphical user interface, the assistive vector trace system provides a selection of potential outlines from extracted segments within the raster image that correspond to the client device input. In this way, the assistive vector trace system provides techniques to partially vectorize a raster image based on matching the client device input with outlines extracted from the raster image.

Additional detail regarding the assistive vector trace system will now be provided with reference to the figures. For example, FIG. 1 illustrates a schematic diagram of an exemplary system environment ("environment") 100 in which an assistive vector trace system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the assistive vector trace system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 10). Moreover, the server device(s) 102 and client device(s) 110 include one of a variety of computing devices (including one or more computing devices as discussed in greater detail with relation to FIG. 10).

As illustrated in FIG. 1, the environment 100 includes the server device(s) 102 and digital design creation and editing system 104. The server device(s) 102 utilizes the digital design creation and editing system 104 to generate, track, store, process, receive, and transmit electronic data, including outlines, images, path input, and vector paths. For example, the server device(s) 102 receives or monitors interactions across the client device(s) 110. In some implementations, the server device(s) 102 transmits content to the client device(s) 110 to cause the client device(s) 110 to display content associated with vector paths. For example, the server device(s) 102 presents an image, path input, vector path, and/or outline to client device(s) 110 and displays an image, path input, vector path, and/or outline on the client device(s) 110 with the image, path input, vector path, and/or outline displayed corresponding to system need (e.g., provide a vector path for display via client application(s) 112).

Additionally, the server device(s) 102 includes all, or a portion of, the assistive vector trace system 106. For example, the assistive vector trace system 106 operates on the server device(s) 102 to access digital content (including images, path inputs, vector paths, and/or outlines), determine digital content changes, and provide localization of content changes to the client device(s) 110. In one or more embodiments, via the server device(s) 102, the assistive vector trace system 106 generates and displays images, path inputs, vector paths, and/or outlines based on the client device(s) 110 input. Example components of the assistive vector trace system 106 will be described below with regard to FIG. 10.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 10. Some embodiments of client device(s) 110 are operated by a user to perform a variety of functions via respective client application(s) 112 such as the generation and modification of vector paths. The client device(s) 110 include one or more applications (e.g., the client application(s) 112) that access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

In one or more embodiments, the assistive vector trace system 106 is implemented in whole, or in part, by the individual elements of the environment 100. Indeed, as shown in FIG. 1, the assistive vector trace system 106 is implemented with regard to the server device(s) 102 and the client device(s) 110. In particular embodiments, the assistive vector trace system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the assistive vector trace system 106 on the client device(s) 110 represents and/or provides the same or similar functionality as described herein in connection with the assistive vector trace system 106 on the server device(s) 102. In some implementations, the assistive vector trace system 106 on the server device(s) 102 supports the assistive vector trace system 106 on the client device(s) 110.

In some embodiments, the assistive vector trace system 106 includes a web hosting application that allows the client device(s) 110 to interact with content and services hosted on the server device(s) 102. To illustrate, in one or more implementations, the client device(s) 110 accesses a web page or computing application supported by the server device(s) 102. The client device(s) 110 provides input to the server device(s) 102 (e.g., selected content items). In response, the assistive vector trace system 106 on the server device(s) 102 generates/modifies digital content. The server device(s) 102 then provides the digital content to the client device(s) 110.

In another implementation, the assistive vector trace system 106 on the server device(s) 102 supports the assistive vector trace system 106 on the client device(s) 110. For instance, in some cases, the assistive vector trace system 106 on the server device(s) 102 generates or learns parameters for one or more machine learning models (e.g., an object detection model and/or an object segmentation model). The assistive vector trace system 106 then, via the server device(s) 102, provides the one or more trained machine learning models to the client device(s) 110. In other words, the client device(s) 110 obtains (e.g., downloads) the one or more machine learning models (e.g., with any learned parameters) from the server device(s) 102. Once downloaded, the one or more machine learning models on the client device(s) 110 utilizes the one or more trained machine learning models to generate outlines independent from the server device(s) 102.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

Figure 2:
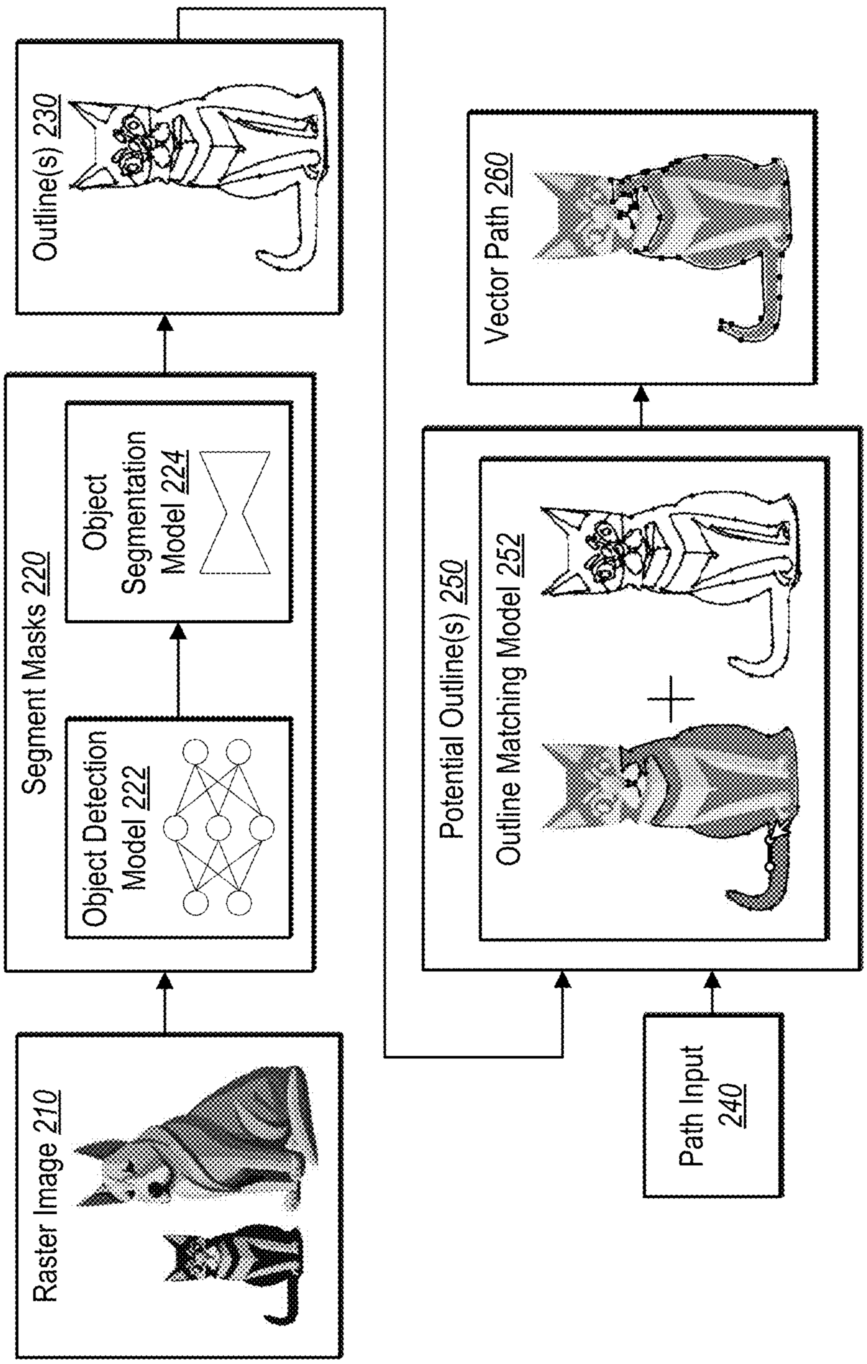
FIG. 2 illustrates an example overview of generating a vector path based on a raster image in accordance with one or more embodiments.

As previously mentioned, in one or more embodiments, the assistive vector trace system 106 generates digital design content including vector paths utilizing machine-learning with assistive guides for path tracing. For instance, FIG. 2 illustrates an overview diagram of the assistive vector trace system 106 generating a vector path based on a raster image in accordance with one or more embodiments. Additional detail regarding the various acts of FIG. 2 is provided thereafter with reference to subsequent figures.

As shown in FIG. 2, the assistive vector trace system 106 generates a vector path 260 based on a raster image 210 and a path input 240 utilizing the disclosed methods. In particular, in one or more embodiments, the assistive vector trace system 106 receives or determines the raster image 210 (e.g., through a client device interaction). For example, the raster image 210 includes an image made up of pixels such as a JPEG, GIF, or PNG. As shown, the raster image 210 contains one or more identifiable objects or elements within the image. For example, the raster image 210 contains semantic objects that are distinctly identified and includes, but is not limited to, semantic objects such as people, animals, buildings, books, tools, and/or symbols.

As further shown, in one or more embodiments, the assistive vector trace system 106 partitions the raster image 210 into segment mask(s) 220. In particular, the assistive vector trace system 106 processes the raster image 210 to identify segments within the raster image 210 and generate the segment mask(s) 220 corresponding to the segments. To illustrate, the assistive vector trace system 106 utilizes an object detection model 222 (e.g., a deep neural network image segmentation model) to classify each pixel in the raster image 210 as belonging to either a semantic object or the background. Furthermore, the object detection model 222 generates one or more object masks where each object mask delineates the boundary of a semantic object within the raster image 210. As further shown, the assistive vector trace system 106 utilizes an object segmentation model 224 to further segment the semantic objects into constituent segments (e.g., visually distinct portions of the semantic objects). In addition, the assistive vector trace system 106 utilizes the object segmentation model to generate segment mask(s) 220 for the constituent segments of the semantic objects within the raster image 210.

As further shown, the assistive vector trace system 106 generates outline(s) 230 from the segment mask(s) 220. In particular, the assistive vector trace system 106 generates outline(s) 230 that correspond to paths that form boundaries around shapes or segments or other contours within the raster image 210. For example, to generate the outline(s) 230, the assistive vector trace system 106 creates binary mask(s) for the segment mask(s) 220 by applying thresholding to the segment mask(s) 220. Further, the assistive vector trace system 106 extracts contour lines to determine the boundaries of segments represented by the segment mask(s) 220. More specifically, the assistive vector trace system 106 generates the outline(s) 230 by converting the extracted contour lines into the outline(s) 230. In one or more embodiments, the assistive vector trace system 106 generates the outline(s) 230) as polylines corresponding to the contour lines.

As further shown, the assistive vector trace system 106 determines potential outline(s) 250. In particular, the assistive vector trace system 106 utilizes an outline matching model 252 with hit detection to determine potential outline(s) 250 within a threshold distance of a path input 240. For example, the assistive vector trace system 106 compares the outline(s) 230 to the path input 240 to select one or more potential outline(s) 250 of the outline(s) 230. To illustrate, the assistive vector trace system 106 receives a client device input comprising the path input 240 that includes one or more points representing a path or a partial path (e.g., partial Bézier curve, input spline, point, line primitive) within the raster image 210 traced using a tool (e.g., pen, brush, or selection tool) in an image editing application. In some cases, the assistive vector trace system 106 flattens the path input 240 into path input line primitives and the outline(s) 230 into outline line primitives. Based on a comparison of the line primitives, the assistive vector trace system 106 selects one or more potential outline(s) of the outline(s) 230 that match the path input 240 (e.g., are within a threshold distance of the path input 240).

Furthermore, in certain embodiments, the assistive vector trace system 106 generates the vector path 260. In particular, the assistive vector trace system 106 generates the vector path 260 by generating a vector path that corresponds to the path input 240 utilizing one of the potential outline(s) 250 of the outline(s) 230. To illustrate, the assistive vector trace system 106 highlights the potential outline(s) 250 on the client device to visually indicate potential outline(s) 250 that correspond to the path input 240. Upon receiving an indication from the client device selecting one of the potential outline(s) 250, the assistive vector trace system autocompletes the path input 240 by fitting a smooth vector path (e.g., B-Spline, Bézier curve) to the selected potential outline to generate the vector path 260 corresponding to the geometry of the selected potential outline.

Figure 3A:
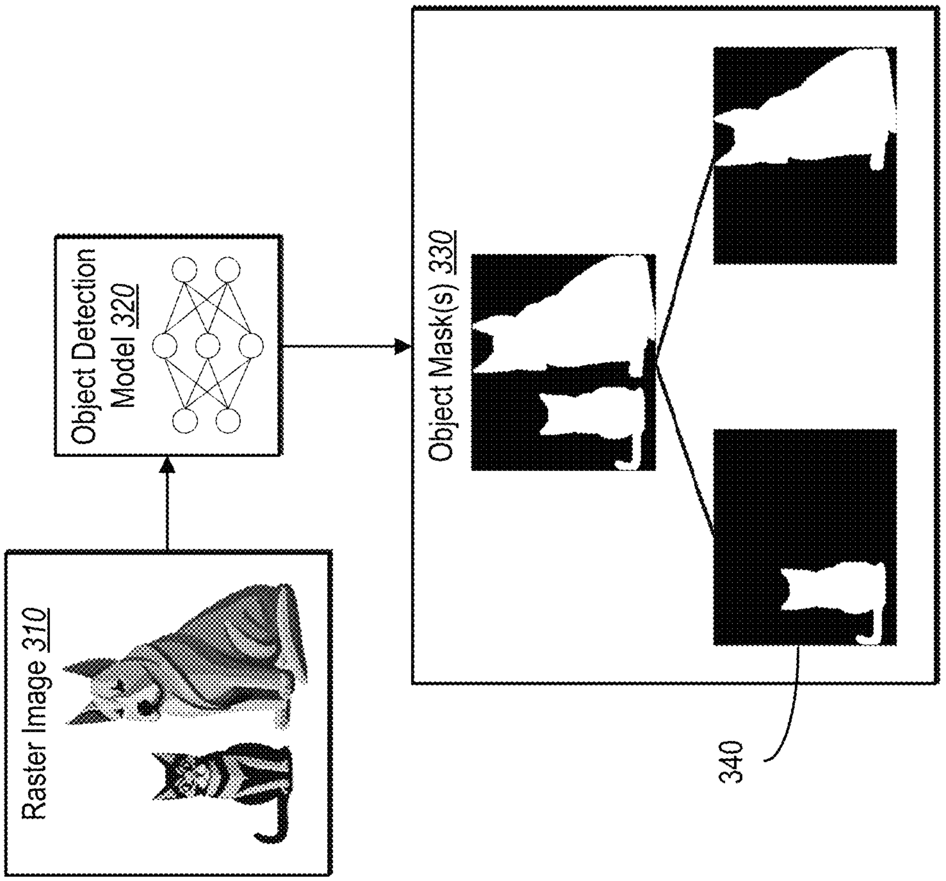
FIG. 3A illustrates an example of generating object masks utilizing an object detection model in accordance with one or more embodiments.
Figure 3B:
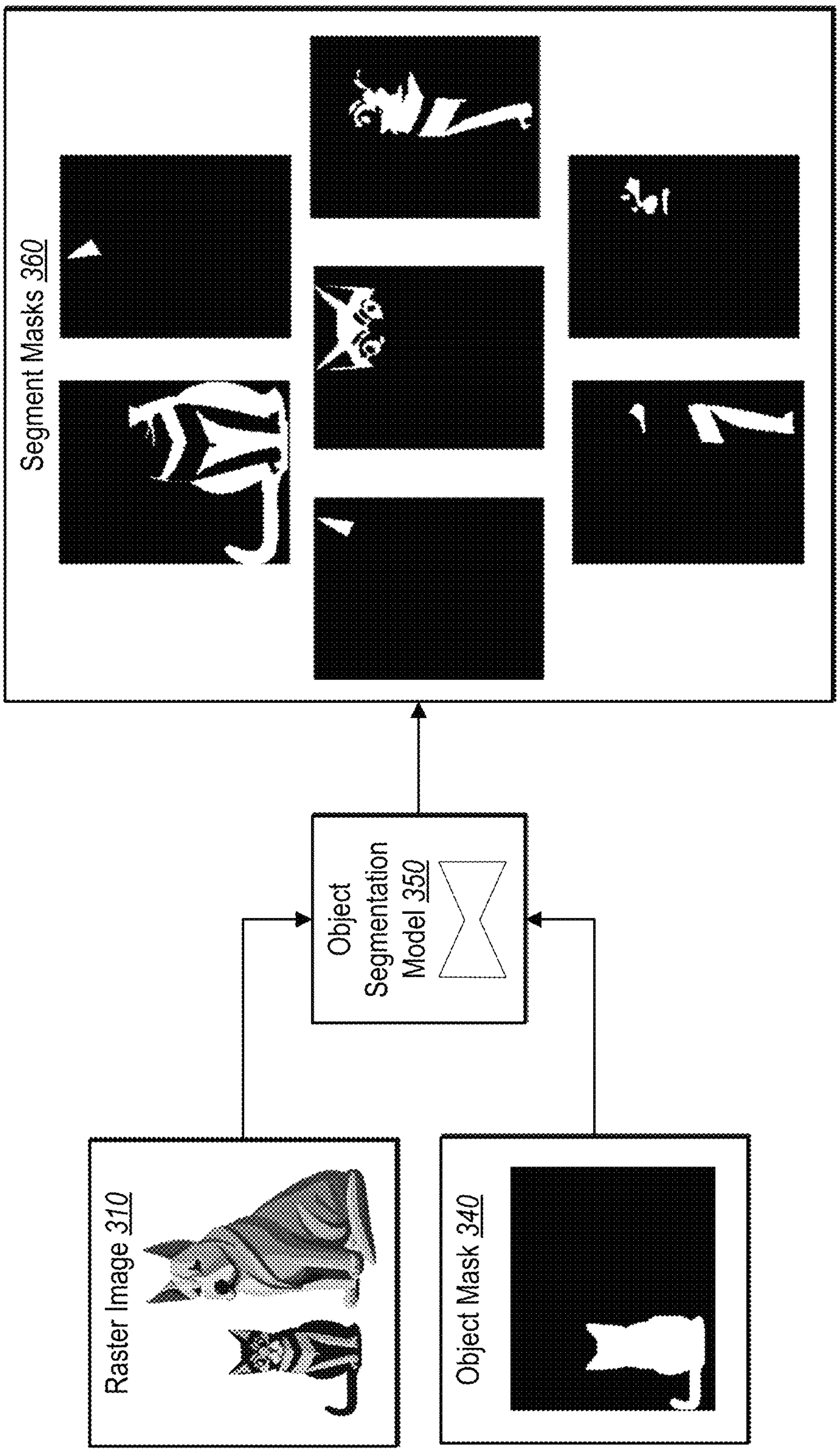
FIG. 3B illustrates an example of generating segment masks utilizing an object segmentation model in accordance with one or more embodiments.

As mentioned, the assistive vector trace system 106 performs a segmentation of the input raster image to generate object masks and segment masks. FIG. 3A illustrates an example of generating object masks utilizing an object detection model in accordance with one or more embodiments. FIG. 3B illustrates an example of generating segment masks utilizing an object segmentation model in accordance with one or more embodiments.

As shown in FIG. 3A, the assistive vector trace system 106 utilizes an object detection model 320 to generate object mask(s) 330 from a raster image 310. In certain embodiments, the assistive vector trace system 106 utilizes an object detection model 320 (e.g., a deep neural network image segmentation model) to delineate semantic objects within the raster image 310. In one or more implementations, the object detection model 320 is a machine learning model (e.g., a neural network) or a collection of machine learning models designed for semantic segmentation tasks (e.g., partitioning an image into multiple segments).

Relatedly, in certain embodiments, a machine learning model includes or refers to a computer algorithm or a collection of computer algorithms that automatically improve for a particular task through iterative outputs or predictions based on the use of data. For example, a machine learning model utilizes one or more learning techniques to improve accuracy and/or effectiveness via training data and one or more loss functions. Along these lines, a neural network includes or refers to a machine learning model that is trained and/or tuned based on inputs to determine digital content items, key elements, or approximate unknown functions. For example, a neural network includes a model of interconnected artificial neurons (e.g., organized in layers) that communicate and learn to approximate complex functions and generate outputs (e.g., image segments) based on a plurality of inputs provided to the neural network. In some cases, a neural network refers to an algorithm (or set of algorithms) that implement deep learning techniques to model high-level abstractions in data. In certain embodiments, a neural network includes various layers, such as an input layer, one or more hidden layers, and an output layer that each perform tasks for processing data. For example, a neural network includes a deep neural network, a convolutional neural network, a transformer neural network, a diffusion neural network, a recurrent neural network (e.g., an LSTM), a graph neural network, or a generative adversarial neural network.

To illustrate, in one or more embodiments, the object detection model 320 comprises a convolutional neural network. For example, the object detection model 320 incorporates an encoder with several layers of convolutions and pooling operations to reduce the spatial dimensions of the image while increasing the depth (number of features or channels). In this way, the object detection model 320 extracts features from the raster image 310 and encodes the input into a compressed form. In one or more embodiments, the object detection model 320 also incorporates a decoder that uses transposed convolutions (e.g., deconvolutions) to expand the spatial dimensions and reduce the depth (number of features or channels) to construct a segmentation map. The object detection model 320 uses the segmentation map to predict the class (e.g., object type) of each pixel. In some cases, the object detection model 320 also uses skip connections to concatenate features from the encoder to the corresponding layers in the encoder. In this way, the object detection model 320 maintains spatial information to determine precise boundaries for objects.

In some cases, the assistive vector trace system 106 utilizes a transformer-based neural network architecture. In particular, the assistive vector trace system 106 leverages a self-attention mechanism to segment objects within an image. For example, the assistive vector trace system 106 integrates transformer models with a streamlined multilayer perceptron (MLP) decoder to efficiently handle segmentation tasks and to capture both the fine details and the broader contextual information necessary for accurate image segmentation. For example, the object detection model 320 utilizes a transformer-based neural network to classify the pixels in the raster image 310 as background pixels or semantic object pixels to generate the object mask(s) 330. In this way, the assistive vector trace system 106 employs hierarchical features of a neural network organized in a pyramid configuration with a positional encoding scheme tailored to the requirements of the segmentation task and generate the object mask(s) 330.

For example, the object detection model 320 classifies each pixel in the raster image 310 as belonging to a semantic object or the background. Further, the object detection model 320 generates object mask(s) 330 corresponding to the semantic objects within the raster image 310, where each of the object mask(s) 330 delineates the boundary of a semantic object detected by the object detection model 320.

As further shown in FIG. 3B, the assistive vector trace system 106 utilizes an object segmentation model 350 to generate segment masks for separate segments of semantic objects in the raster image 310. In one or more implementations, the object segmentation model 350 is a machine learning model (e.g., a neural network) or a collection of machine learning models designed for semantic segmentation tasks (e.g., partitioning an image into multiple segments). Similar to the object detection model 320, in some embodiments, the object segmentation model 350 comprises a convolutional neural network and/or a transformer-based neural network architecture.

To illustrate, in one or more embodiments, the object segmentation model 350 comprises a neural network that generates masks for more detailed segmentations of objects. For example, the object segmentation model 350 incorporates an image encoder, a prompt encoder, and a mask decoder. The object segmentation model 350 utilizes the image encoder to generate image embeddings from the raster image 310 to capture various aspects of the image, such as textures colors, shapes, and spatial hierarchies. The object segmentation model 350 utilizes the prompt encoder to encode the object mask 340 into positional prompt embeddings. Further, the object segmentation model 350 uses the mask decoder to map the combined embeddings from the raster image 310 and the object mask 340 to generate the segment masks 360. In some cases, the object segmentation model 350 uses transformer blocks to perform operations for prompt self-attention and cross-attention between the prompt embeddings and image embeddings to update all the embeddings.

For example, the assistive vector trace system 106 further segments the object mask(s) 330 utilizing the object segmentation model 350. For example, the object segmentation model 350 utilizes the object segmentation model 350 to further segment the object masks(s) and determine visually distinct segments of the semantic objects within the raster image 310. In particular, the object segmentation model 350 generates segment masks 360, where each of the segment masks 360 delineates the boundary of a segment detected by the object segmentation model 350.

Figure 4:
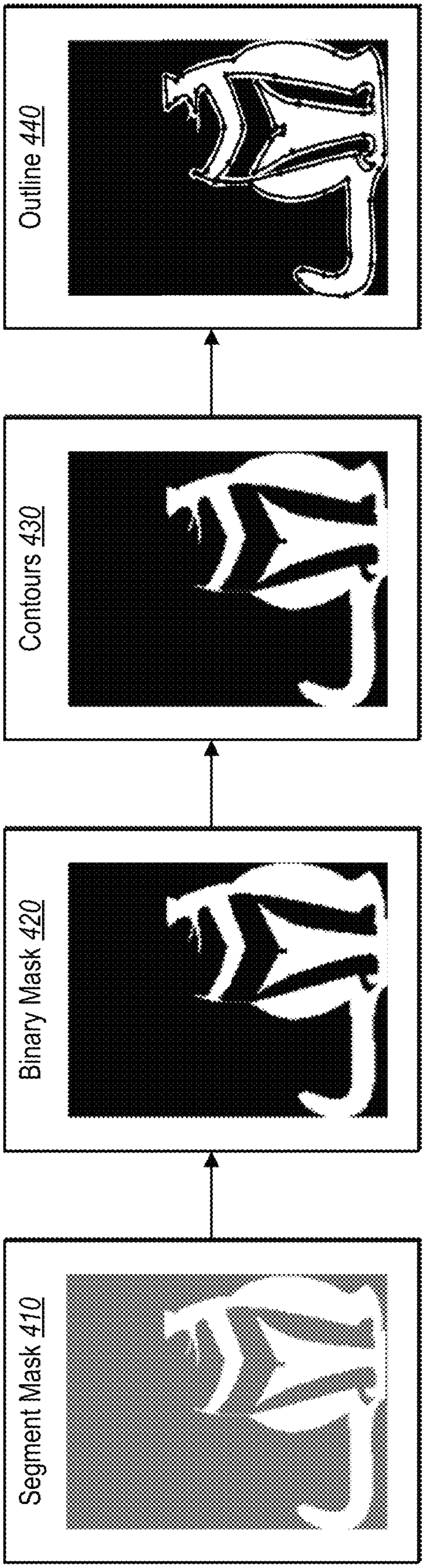
FIG. 4 illustrates an example of generating an outline corresponding to a segment mask in accordance with one or more embodiments.

As mentioned, the assistive vector trace system 106 converts the segment masks from the raster image into outlines corresponding to segments within the raster image. FIG. 4 illustrates an example of generating an outline corresponding to one or more contours in a segment mask in accordance with one or more embodiments.

As shown in FIG. 4, the assistive vector trace system 106 generates an outline 440 based on a segment mask 410. In particular, the assistive vector trace system 106 generates a binary mask 420 from the segment mask 410. To illustrate, the assistive vector trace system 106 transforms the segment mask 410 (e.g., an alpha mask with a range of alpha values) into a binary image through thresholding. For example, the assistive vector trace system 106 sets a threshold value as the cut-off point to distinguish the foreground (e.g., semantic object) from the background. When thresholding the segment mask 410, the assistive vector trace system 106 assigns pixels that are on one side of the threshold value a first color value (e.g., white, representing the value '1') and those on the other side a second color value (e.g., black, representing the value '0'). After thresholding, the binary mask 420 clearly demarcates the object, with pixels of the first color value defining the semantic object and pixels of the second color value indicating the absence of the semantic object.

As also shown, the assistive vector trace system 106 generates contours 430 corresponding to the binary mask 420. In particular, the assistive vector trace system 106 utilizes a contour extraction algorithm to identify and extract the outlines or boundaries of the segments within the binary mask 420. For example, the assistive vector trace system 106 utilizes one or more border following algorithms to perform a topological analysis of the binary mask 420. To illustrate, the assistive vector trace system 106 utilizes a first border following algorithm to determine surroundedness relations among borders of the binary mask 420 and generate a representation of the binary mask 420 for feature extraction. Additionally, in some embodiments, the assistive vector trace system 106 utilizes a second border following algorithm follows the outermost borders (e.g., not surrounded by holes) of the binary mask 420.

In some cases, the assistive vector trace system 106 applies the contour extraction algorithm to simplify the contour data by eliminating points that contribute little to the overall shape. In this way, the assistive vector trace system 106 reduces the computational load and simplifies the data for further processing (e.g., by reducing the number of anchor points below a certain limit or threshold. By approximating the contours utilizing the contour extraction algorithm, the assistive vector trace system 106 reduces the number of anchor points, resulting in a more compact and manageable representation of the shape that is visually similar to the original outline.

As also shown, the assistive vector trace system 106 generates the outline 440 from the contours 430. In particular, the assistive vector trace system 106 converts the contours 430 into polylines (e.g., sequences of connected line primitives) from contour points of the contours 430. For example, the assistive vector trace system 106 converts the set of contour points which represent a closed boundary (e.g., contours 430) of a segment into a polygon (e.g., a closed polyline). More specifically, the assistive vector trace system 106 connects the contour points in order to generate a polyline (or polygon) and generate the outline 440 of the segment represented by the segment mask 410.

Figure 5:
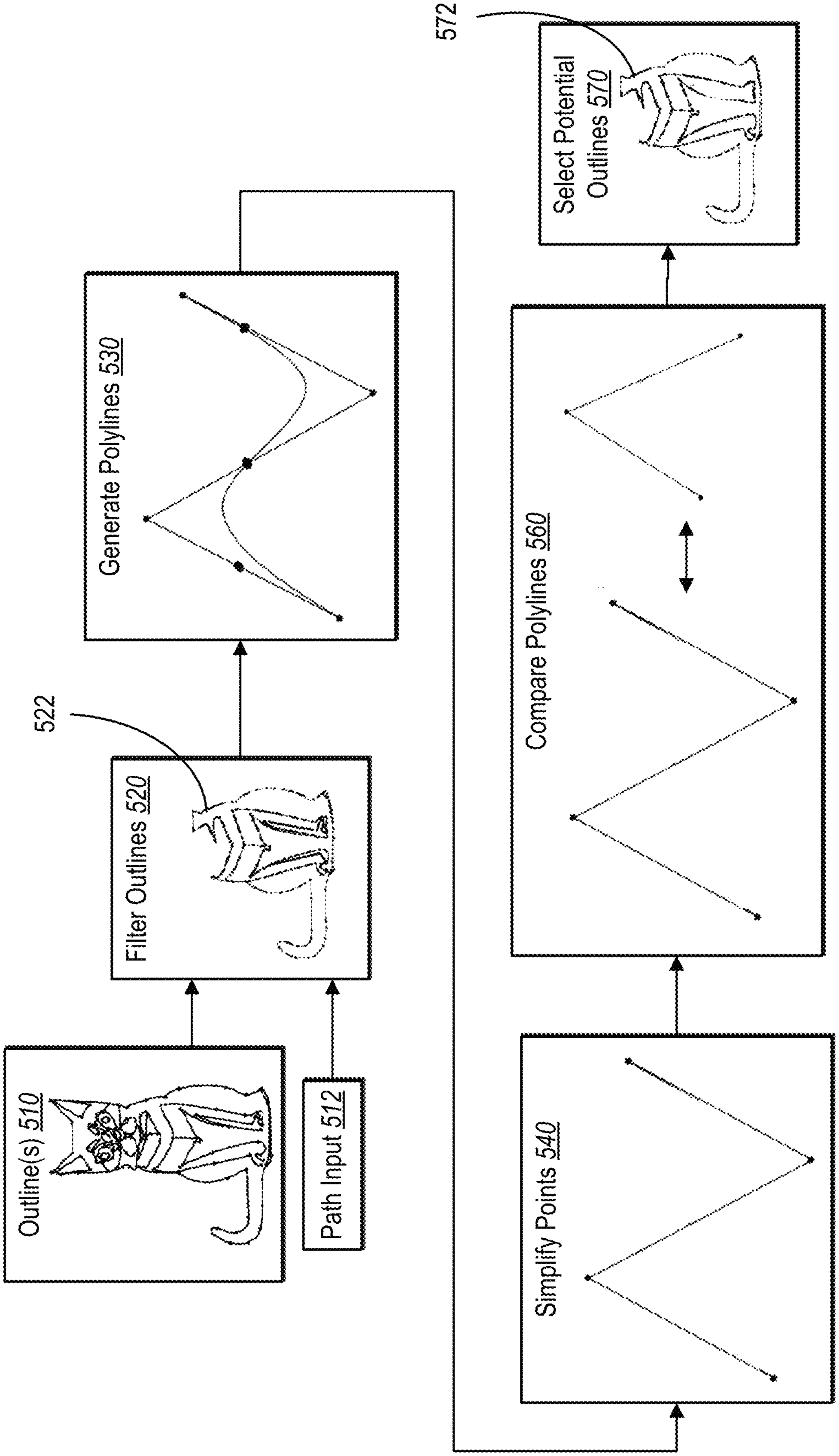
FIG. 5 illustrates an example of utilizing an outline matching model with hit detection to select potential outlines of segments in accordance with one or more embodiments.

As also mentioned, the assistive vector trace system 106 utilizes an outline matching model to match outlines of objects in the raster image with a client device input (e.g., a path input). FIG. 5 illustrates an example of utilizing an outline matching model in accordance with one or more embodiments. Notably, in certain embodiments, the assistive vector trace system 106 iteratively performs the acts of FIG. 5 and redetermines potential outlines based on one or more changes to the client device input.

As shown in FIG. 5, the assistive vector trace system 106 performs act 520 to select filtered outlines 522 from outlines 510 extracted in connection with one or more segments in a raster image. As described above, in one or more embodiments, the assistive vector trace system 106 generates a set of outlines corresponding to the segment masks for a semantic object within the raster image (e.g., outlines 510 that correspond to segments within the cat object in the raster image). Furthermore, based on the location of the path input 512, the assistive vector trace system 106 restricts potential outlines by excluding outlines of the outlines 510 that are not within a threshold distance of the path input 512. In this way, the assistive vector trace system 106 filters the outlines 510 to select the filtered outlines 522.

For example, the assistive vector trace system 106 utilizes bounding boxes to perform the act 520 to filter the outlines and determine the filtered outlines 522. In particular, the assistive vector trace system 106 determines a bounding box corresponding to the path input 512. The assistive vector trace system 106 also determines bounding boxes corresponding to the outlines 510. Further, the assistive vector trace system 106 selects the filtered outlines 522 as a subset of the outlines 510 with bounding boxes that intersect with the bounding box of the path input 512. In this way, the assistive vector trace system 106 eliminates irrelevant outlines outside a threshold distance of the path input 512.

In one or more embodiments, the assistive vector trace system 106 performs act 520 utilizing hit detection to filter the outlines 510. In particular, the assistive vector trace system 106 utilizes hit detection to detect whether the path input 512 intersects with any of the outlines 510. Indeed, by utilizing hit detection, the assistive vector trace system 106 performs act 520 to filter the outlines and include the outlines that the client device is likely trying to trace, aligning with user intent. Furthermore, in some embodiments, the assistive vector trace system 106 dilates, or expands, the path input 512. In this way, even if the vector outline is slightly offset, the hit detection employed by the assistive vector trace system 106 will still incorporate an outline (of the outlines 510) into the filtered outlines 522 if the outline falls within the dilated area.

As also shown in FIG. 5, the assistive vector trace system 106 performs act 530 to generate polylines. For example, the assistive vector trace system 106 converts the filtered outlines 522 into outline polylines and the path input 512 into a path polyline. In particular, the assistive vector trace system 106 converts each of the filtered outlines 522 into outline polylines and the path input 512 into a sequence of straight-line segments (e.g., line primitives) that approximate the curves. In addition, the assistive vector trace system 106 normalizes the polylines to ensure the parameterization of the filtered outlines 522 and the path input 512 is consistent. In some cases, the assistive vector trace system 106 normalizes the polylines by adjusting the polylines so that the points on one polyline correspond to points on the second polyline at the same relative distances along the polylines.

In certain embodiments, the assistive vector trace system 106 utilizes the following algorithms to generate the polylines, thereby reducing the complexity of the filtered outlines 522 and path input 512 while maintaining the integrity of the original shapes:

Algorithm 1 Flatten Quadratic Bezier Curve into Line Segments

```
procedure QUADRATICBEZIER(t, P0, P1, P2)
    return (1 − t)^2 P0 + 2(1 −t)tP1 + t^2 P2
procedure FLATTENBEZIER(P0, P1, P2, num_segments)
    points ← [P0]
    for i ← 1 to num_segments do
        t ← i / num_segments
        point ← QuadraticBezier(t, P0, P1, P2)
        points.append(point)
    return points
```

Algorithm 2 Flatten Cubic Bezier Curve into Line Segments

```
procedure CUBICBEZIER(t, P0, P1, P2, P3)
        return (1 − t)^3 P0 + 3(1 − t)^2 tP1 + 3(1 − t)t^2 P2 + t^3 P3
procedure SUBDIVIDE(P0, P1, P2, P3, tolerance)
        t_mid ← 0.5
        Q0 ← CubicBezier(t_mid, P0, P1, P2, P3)
        Q1 ← CubicBezier(t_mid, P1, P2, P3, P3)
        R0 ← CubicBezier(t_mid, Q0, Q1, Q1, Q1)
        if ||R0 − P0|| + ||R0 − P3|| < tolerance then
                return [P0, R0, P3]
        else
                return SubDivide(P0, Q0, R0, P3, tolerance)
```

Specifically, as indicated above, the assistive vector trace system 106 utilizes Algorithm 1 to flatten quadratic Bézier curves into line segments and Algorithm 2 to flatten cubic Bézier curves into line segments.

As also shown, the assistive vector trace system 106 performs act 540 to simplify the points of the polylines generated in act 530 to generate simplified polylines. In particular, in some cases, when the assistive vector trace system 106 flattens the filtered outlines 522 and the path input 512 to generate polylines, a large number of points are generated. For example, when the assistive vector trace system 106 implements the fine details of the filtered outlines 522 and the path input 512 using line primitives, redundant and/or intermediate points are generated (e.g., excess points within a straight line). In one or more embodiments, to remove the redundant points from the polylines, the assistive vector trace system 106 utilizes a simplification algorithm such as the following:

Algorithm 3 Point Simplification Algorithm

```
procedure SIMPLIFYPOINTS(originalPoints, tolerance)
    simplifiedPoints ← [originalPoints[0]] ▷ Initialize with the first point
    for i ← 1 to length(originalPoints) − 2 do
        segment ← [originalPoints[i − 1], originalPoints[i], originalPoints[i + 1]]
        if Distance(segment) > tolerance then
            simplifiedPoints.append(originalPoints[i])
    simplifiedPoints.append(originalPoints[length(originalPoints) − 1]) ▷ Include the last
point
    return simplifiedPoints
function DISTANCE(segment) ▷ Calculate the distance between two consecutive points in
a segment
    return ||segment[0] − segment[2]||
```

As further shown in FIG. 5, the assistive vector trace system 106 performs an act 560 to compare the simplified polylines generated in act 540. In particular, the assistive vector trace system 106 performs an act 570 to select potential outline(s) 572 from the filtered outlines 522 which match the path input 512 based on comparing the points of the simplified polylines. To illustrate, the assistive vector trace system 106 compares the simplified polylines for the filtered outlines 522 with the simplified polylines for the path input 512 to select potential outline(s) 572. Indeed, based on the comparison of the points of the polylines satisfying a match tolerance threshold, the assistive vector trace system 106 selects potential outline(s) 572 from the filtered outlines 522. In this way, the assistive vector trace system 106 selects potential outline(s) 572 that correspond to an outline the user intends to trace.

Figure 6A:
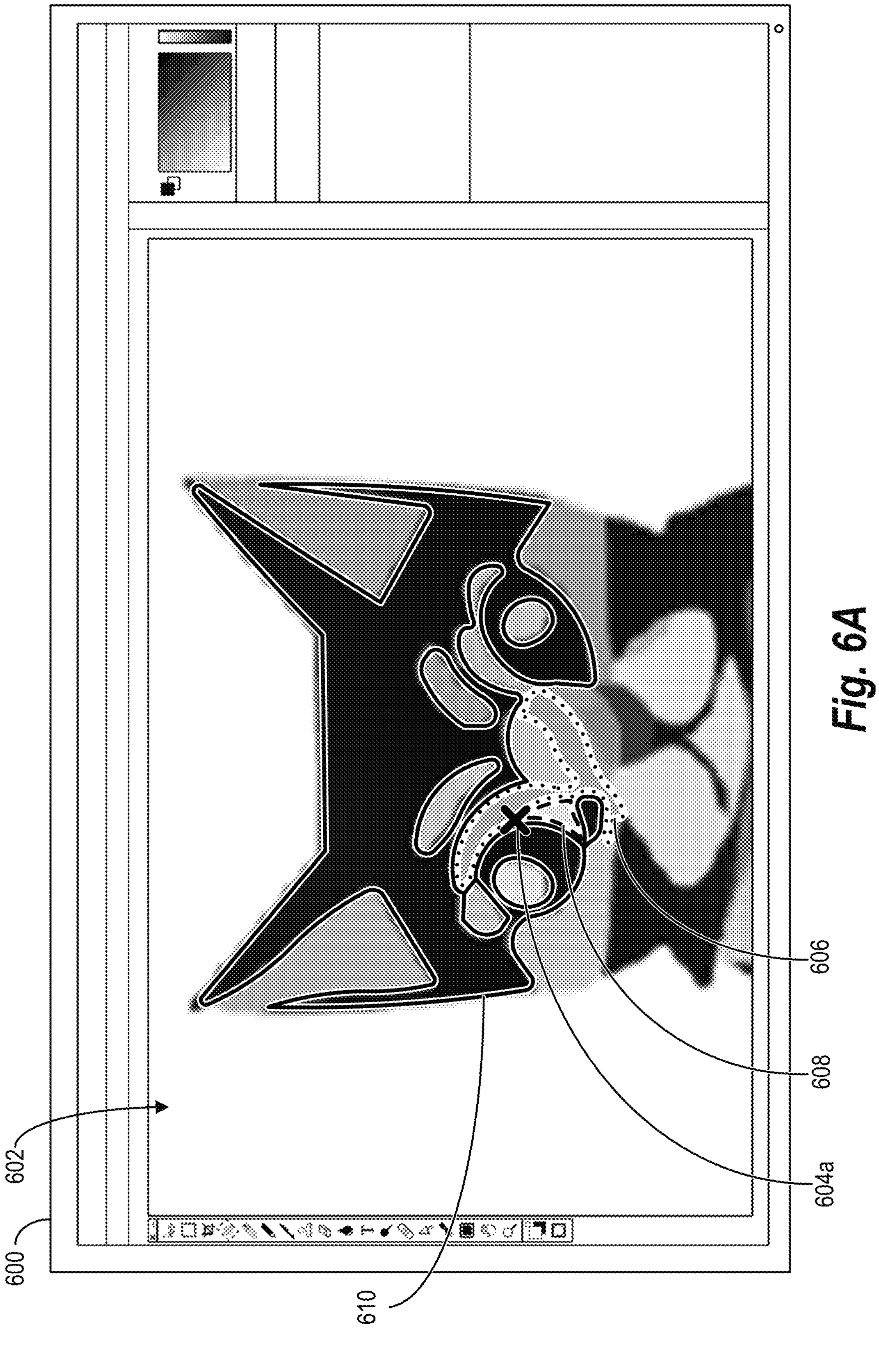
FIGS. 6A-6C illustrate an example of generating and providing assistive guides for outlines associated with a client device input within a graphical user interface in accordance with one or more embodiments.
Figure 6B:
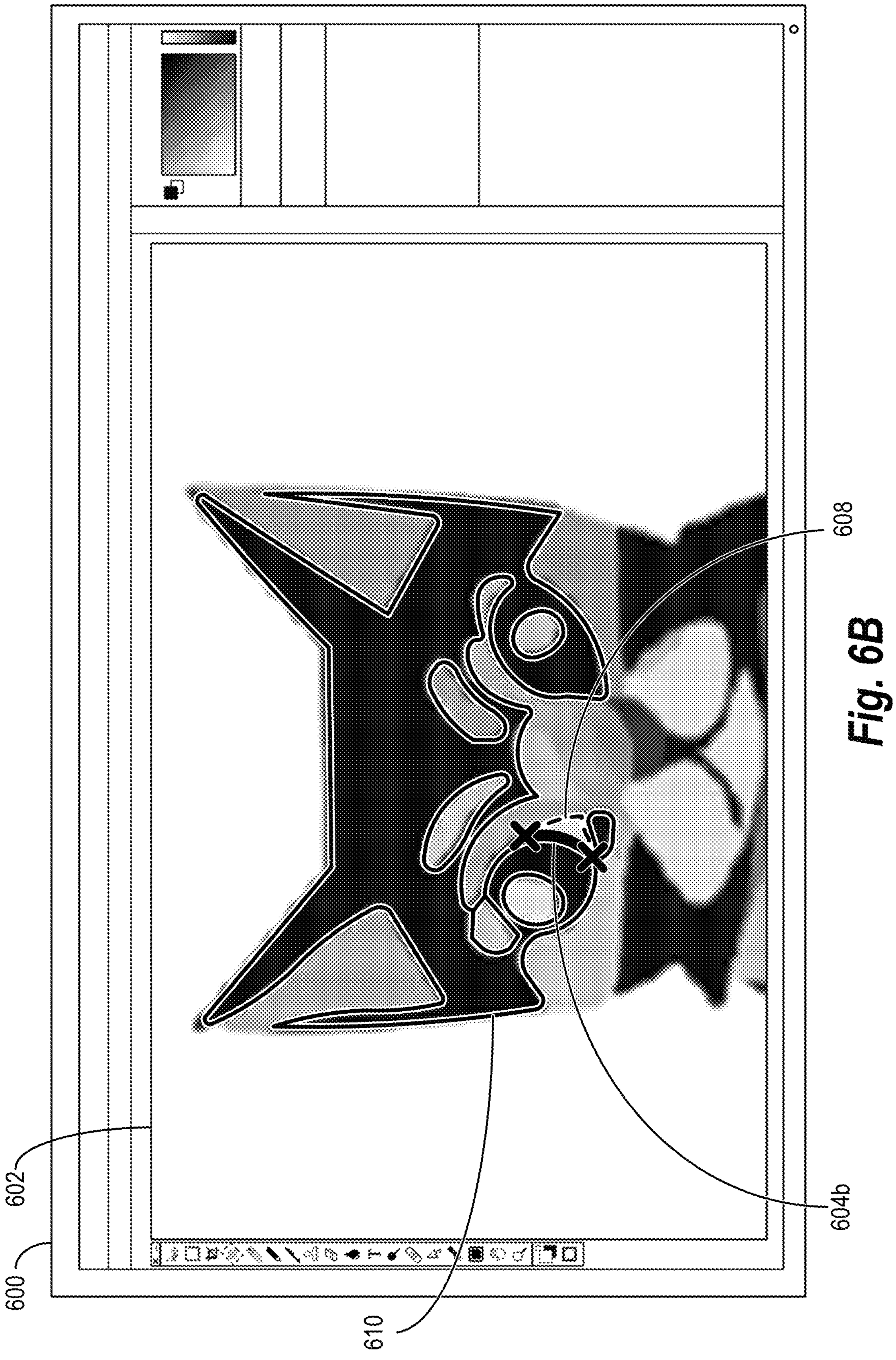
Figure 6C:
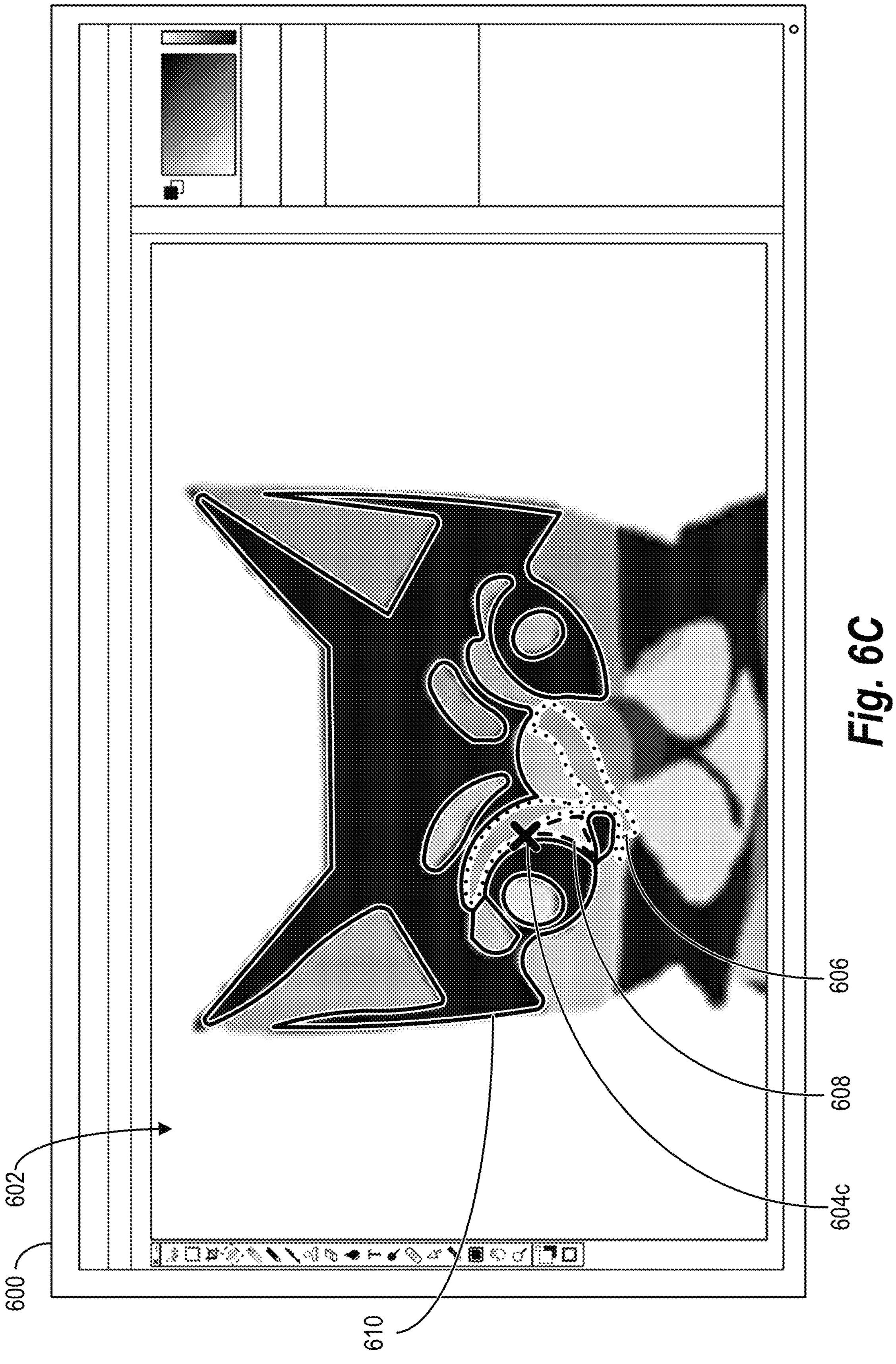

To further illustrate, the assistive vector trace system 106 provides an efficient, intuitive graphical user interface for creating outlines corresponding to client device input. FIGS. 6A-6C illustrate examples of generating and providing outlines associated with a client device input within a graphical user interface in accordance with one or more embodiments. Additionally, as illustrated in FIGS. 6A-6C, the assistive vector trace system 106 provides adaptive feedback within the graphical user interface based on changes to the client device input.

As shown in FIG. 6A, the assistive vector trace system 106 interacts with a client device 600 utilizing a vector-based application (e.g., an image editing application for generating or editing vector images) to modify a raster image 602. As shown, based on a client device input 604*a*, the assistive vector trace system 106 provides adaptive feedback to the client device and displays a first highlighted potential outline 606, a second highlighted potential outline 608, and a third highlighted potential outline 610. As described in relation to previous figures, the assistive vector trace system 106 determines potential outlines that correspond to the client device input 604*a* (which includes a portion of the path the user intends to trace). For example, the assistive vector trace system 106 determines that the bounding boxes for the first highlighted potential outline 606, the second highlighted potential outline 608, and the third highlighted potential outline 610 intersect with the bounding box for the client device input 604*a*. Thus, the assistive vector trace system 106 determines that the first highlighted potential outline 606, the second highlighted potential outline 608, and the third highlighted potential outline 610 match a path that the user intends to trace.

As further shown in FIG. 6B, the assistive vector trace system 106 provides adaptive feedback and updates the display of potential outlines on the client device 600 to remove one or more potential outlines in response to changes to a client device input. In particular, in response to a change to the client device input 604*a* to add points as shown by client device input 604*b*, the assistive vector trace system 106 redetermines potential outlines that correspond to the client device input 604*b* (which includes an updated portion of the path the user intends to trace). For example, the assistive vector trace system 106 filters potential outlines (e.g., reduces the search space of outlines), simplifies the polylines for the client device input 604*b* and filtered outlines, and compares the polylines to redetermine potential outlines associated with the client device input 604*b*.

As shown, based on filtering the potential outlines, the assistive vector trace system 106 removes the first highlighted potential outline 606 from display on the client device. As also shown, the assistive vector trace system 106 determines that the bounding boxes for the second highlighted potential outline 608 and the third highlighted potential outline 610 intersect with the bounding box for the client device input 604*b*. In turn, based on the client device input 604*b*, the assistive vector trace system 106 displays (or does not remove from display) the second highlighted potential outline 608 and the third highlighted potential outline 610.

In some embodiments, in response to a change to the client device input 604*b*, the assistive vector trace system 106 determines a change to the shape of a path input. In this case, if the bounding box for the client device input 604*b* does not change, the assistive vector trace system 106 does not update and/or filter the potential outlines further (no change to the initial search space). In this case, to update the potential outlines for display on the client device, the assistive vector trace system 106 generates and simplifies a polyline for the edited client device input 604*b* and compares polylines to filter the potential outlines associated with the edited client device input 604*b*.

As further shown in FIG. 6C, in some embodiments, the assistive vector trace system 106 provides adaptive feedback and updates the display of potential outlines on the client device to add one or more potential outlines in response to additional changes to a client device input. For example, based on modifying the client device input 604*c* to remove points from the path input (e.g., to remove a most recently added point), the assistive vector trace system 106 updates the display of potential outlines on the client device to add one or more potential outlines. For example, the assistive vector trace system 106 filters potential outlines (e.g., to enlarge the search space of outlines), simplifies the polylines for the client device input 604*c* and filtered outlines, and compares the polylines to redetermine potential outlines associated with the client device input 604*c*.

As shown, based on filtering the potential outlines, the assistive vector trace system 106 adds (or adds back) the first highlighted potential outline 606 to the display. As also shown, the assistive vector trace system 106 determines that the bounding boxes for the second highlighted potential outline 608 and the third highlighted potential outline 610 intersect with the bounding box for the client device input 604*a*. As shown, based on a client device input 604*a*, the assistive vector trace system 106 displays the first highlighted potential outline 606, the second highlighted potential outline 608, and the third highlighted potential outline 610.

In one or more embodiments, the assistive vector trace system 106 maintains a history of potential outlines based on a search space corresponding to a client device input as points are added to the client device input. Thus, as points are added or removed, the assistive vector trace system 106 quickly narrows or expands the set of potential outlines to provide assistive guides in the graphical user interface. Furthermore, in some embodiments, a change in position of a point in a client device input causes the assistive vector trace system 106 to determine a new search/filtering of potential outlines corresponding to the client device input.

Figure 7A:
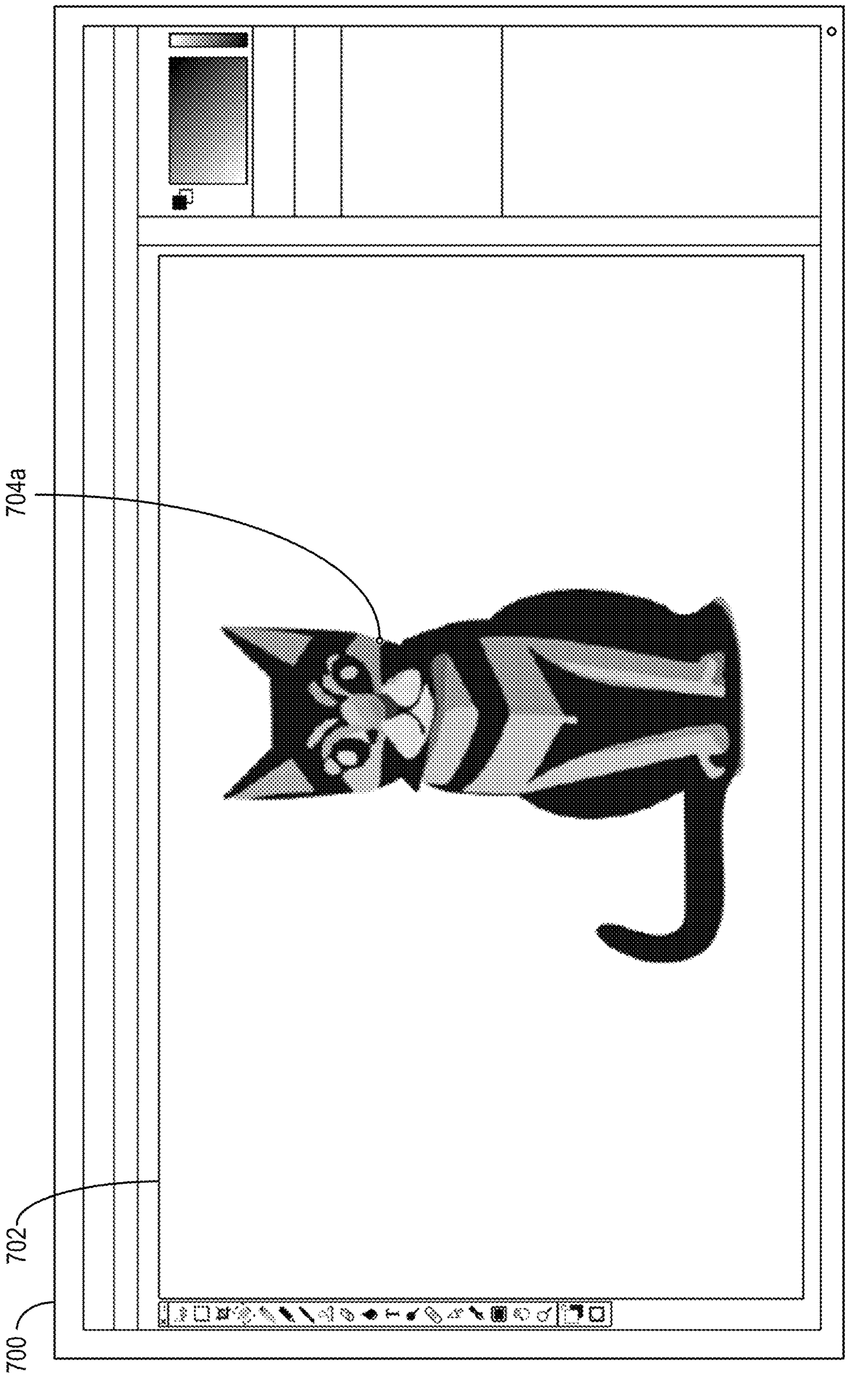
FIGS. 7A-7C illustrate an example of providing adaptive feedback within a graphical user interface and automatically completing a vector path in accordance with one or more embodiments.
Figure 7B:
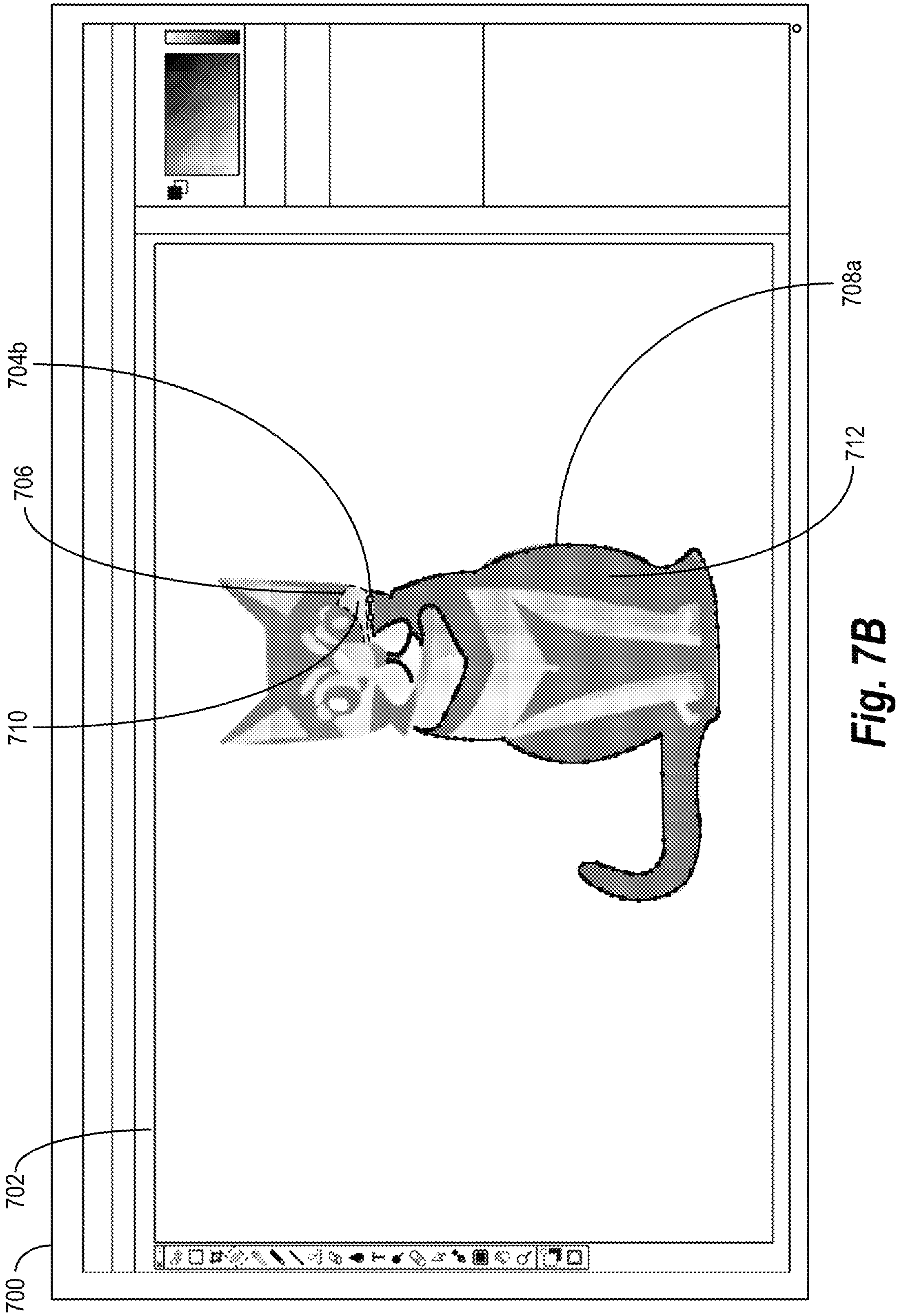
Figure 7C:
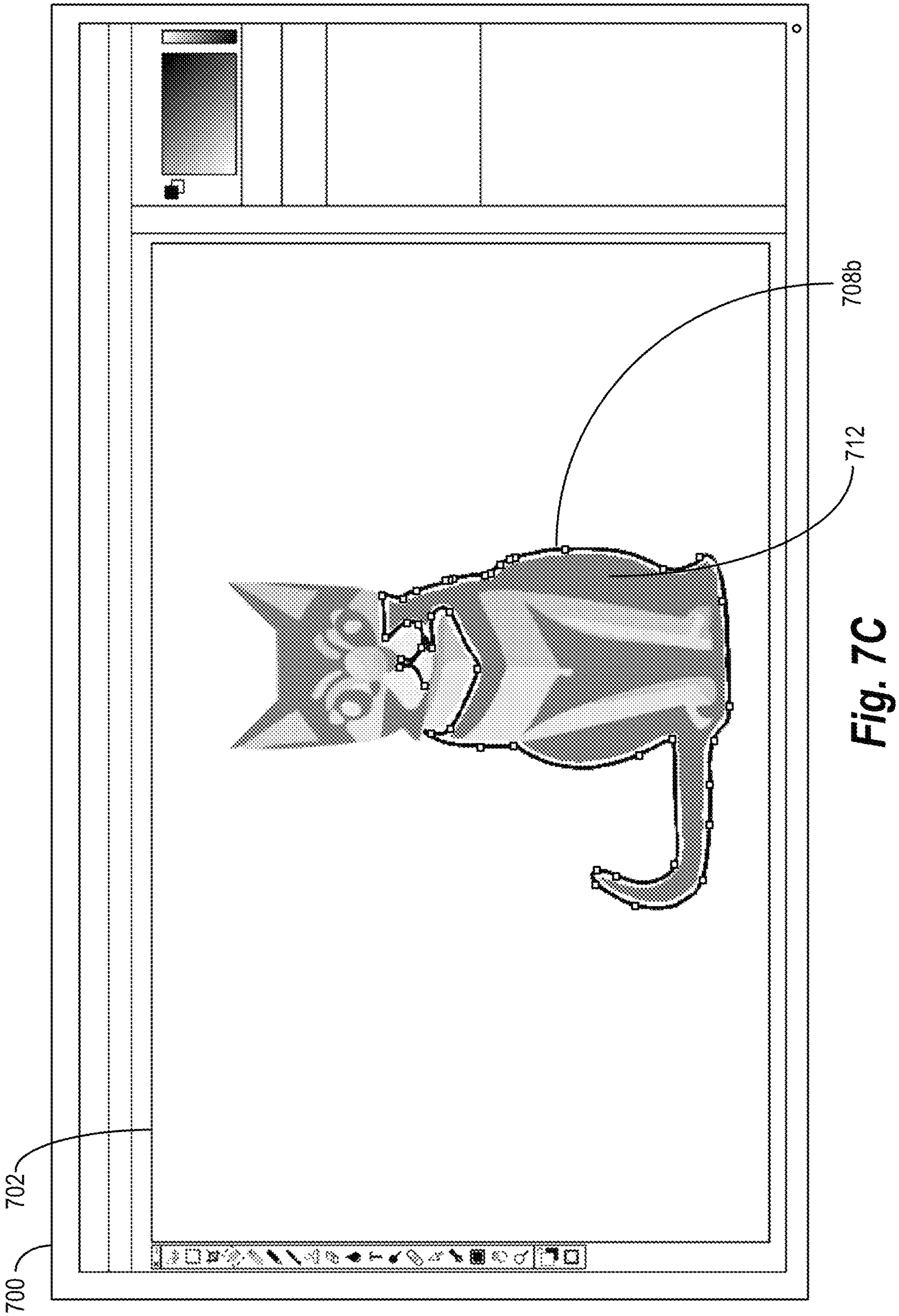

As mentioned, the assistive vector trace system 106 provides adaptive feedback to the client device and auto-completes vector paths. FIGS. 7A-7C illustrate an example of providing adaptive feedback within a graphical user interface and automatically completing a vector path in accordance with one or more embodiments.

As shown in FIG. 7A, the assistive vector trace system 106 interacts with a vector-based application on client device 700 to modify a raster image 702. For example, the assistive vector trace system 106 receives a client device input 704*a* indicating a point corresponding to a segment boundary within the raster image 702. In certain embodiments, as described in relation to FIGS. 6A-6C, the assistive vector trace system 106 displays potential outlines corresponding to segment boundaries within a threshold distance of the client device input 704*a* in the raster image.

As further shown in FIG. 7B, the assistive vector trace system 106 receives client device input 704*b* indicating an additional point corresponding to the segment boundary for segment 710 and the segment boundary for segment 712 within the raster image. As further shown, the client device input 704*b* corresponds to an incomplete, or partially traced, vector path. In certain embodiments, based on the selection of the additional point, the assistive vector trace system 106 displays potential outlines corresponding to segment boundaries within a threshold distance of the client device input 704*b* in the raster image.

To illustrate, the assistive vector trace system 106 provides a highlighted indication of outlines that correspond to the client device input 704*b*. In particular, the assistive vector trace system 106 generates and displays one or more outlines that include the incomplete vector path of the client device input 704*b* and correspond to potential outlines for segments within the raster image. To illustrate, based on the client device input 704*b*, the assistive vector trace system 106 displays the highlighted outline 706 and the highlighted outline 708*a*. As shown, the highlighted outline 706 includes the segment boundary of segment 710, including the section of the segment boundary traced by the client device input 704*b*. As shown, the highlighted outline 708*a* includes the segment boundary of segment 712, including the section of the segment boundary traced by the client device input 704*b*.

As further shown in FIG. 7C, based on a client device interaction to select the highlighted outline 708*a*, the assistive vector trace system 106 generates a completed vector path 708*b*. In particular, the assistive vector trace system 106 automatically generates and displays the completed vector path 708*b* without further client device input. To illustrate, the assistive vector trace system 106 receives a client device interaction (e.g., press of a modifier key such as <shift>) and generate a completed vector path 708*b* outlining the segment 712 and corresponding to the geometry of the highlighted outline 708*a*. In some embodiments, the assistive vector trace system 106 corrects any imperfections of the partial curve of the client device input 704*b* by generating the completed vector path 708*b* to correspond to the outline of the segment 712 (and replacing the client device input 704*b*).

In one or more embodiments, to generate the completed vector path 708*b*, the assistive vector trace system 106 converts the polyline of the highlighted outline 708*a* into a vector curve to generate the completed vector path 708*b*. In particular, the assistive vector trace system 106 converts the polyline of the highlighted outline 708*a* into a vector curve for editing within the vector-based application, while maintaining the accuracy and aesthetics of the highlighted outline 708*a*. In certain embodiments, the assistive vector trace system 106 fits a cubic Bézier curve to the highlighted outline 708*a* to generate the completed vector path 708*b*. In certain embodiments, the assistive vector trace system 106 fits a B-Spline curve to approximate the highlighted outline 708*a* using B-Spline fitting (e.g., by adjusting control points to reduce one or more predefined metrics). In some embodiments, the assistive vector trace system 106 utilizes partial differential equations to preserve the salient geometric features of the highlighted outline 708*a* and smooth low-level details. Furthermore, in certain embodiments, to generate the potential outlines (e.g., the highlighted outline 706 and the highlighted outline 708*a*), the assistive vector trace system 106 converts the polylines into vector curves as described before displaying the potential outlines in the graphical user interface.

Figure 8:
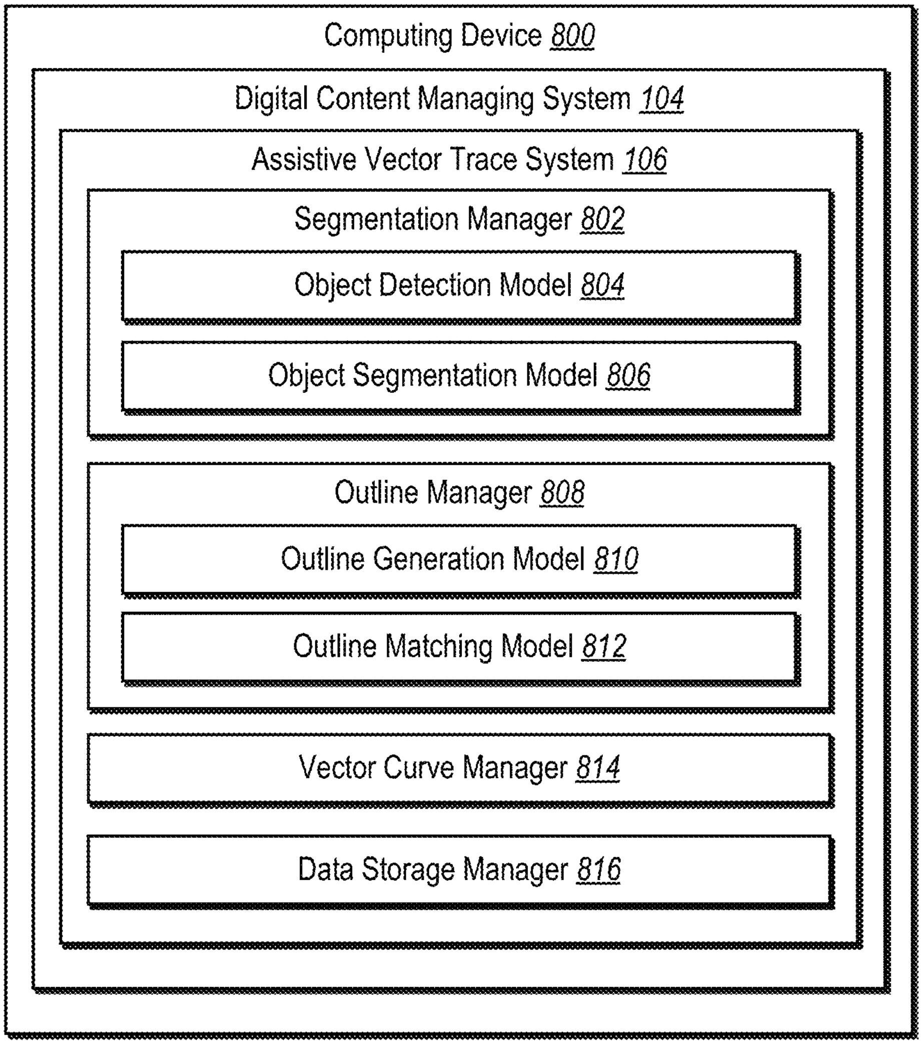
FIG. 8 illustrates a diagram of an example architecture of the assistive vector trace system in accordance with one or more implementations.

Turning now to FIG. 8, additional detail will now be provided regarding various components and capabilities of the assistive vector trace system 106. In particular, FIG. 8 illustrates the assistive vector trace system 106 implemented by the computing device 800 (e.g., the server device(s) 102 and/or one of the client device(s) 110 discussed above with reference to FIG. 1). Additionally, the assistive vector trace system 106 is also part of the digital design creation and editing system 104. As shown in FIG. 8, the assistive vector trace system 106 includes, but is not limited to, a segmentation manager 802, an outline manager 808, a vector curve manager 814, and a data storage manager 816.

As just mentioned, and as illustrated in FIG. 8, the assistive vector trace system 106 includes the segmentation manager 802. In one or more embodiments, the segmentation manager 802 manages the segmentation of objects within the raster image. The segmentation manager 802 utilizes an object detection model 804 to segment an image based on semantic objects within the image. In addition, the segmentation manager 802 utilizes an object segmentation model 806 to further segment the semantic objects into visually distinct segments. The segmentation manager 802 utilizes the object detection model 804 and the object segmentation model 806 to generate segment masks corresponding to the segments within the raster image.

Additionally, as shown in FIG. 8, the assistive vector trace system 106 includes the outline manager 808. The outline manager 808 manages the generation and selection of outlines corresponding to segments within the raster image. In particular, the outline manager 808 utilizes an outline generation model 810 to generate outlines that correspond to the segment masks. For example, the outline manager 808 utilizes the outline generation model 810 to generate binary masks and determine the contours of the segments within the raster image to generate the outlines. In addition, the outline manager 808 utilizes an outline matching model 812 to convert the outlines to polylines (e.g., line primitives) and compares the outlines to a client device input. Furthermore, the outline manager 808 provides, for display on the client device, highlighted outlines that match the client device input.

As further shown in FIG. 8, the assistive vector trace system 106 includes the vector curve manager 814. In particular, the assistive vector trace system 106 utilizes the vector curve manager 814 to generate a vector path that corresponds to a selected outline. In particular, the vector curve manager 814 receives a selection of an outline from among the highlighted outlines. Furthermore, the vector curve manager 814 generates a vector path (e.g., a Bézier curve) that corresponds to the geometry of the outline, incorporates the boundary traced by the client device input, and outlines a segment of the raster image.

Additionally, as shown, the assistive vector trace system 106 includes data storage manager 816. In particular, data storage manager 816 (implemented by one or more memory devices) stores the digital design documents, including the raster images. The data storage manager 816 facilitates the use of the digital design documents by the assistive vector trace system 106.

Each of the components 802-816 of the assistive vector trace system 106 includes software, hardware, or both. For example, the components 802-816 include one or more instructions stored on a computer-readable storage medium and executable by processors of one or more computing devices, such as a client device or server device. When executed by the one or more processors, the computer-executable instructions of the assistive vector trace system 106 causes the computing device(s) to perform the methods described herein. Alternatively, the components 802-816 include hardware, such as a special-purpose processing device to perform a certain function or group of functions. Alternatively, the components 802-816 of the assistive vector trace system 106 include a combination of computer-executable instructions and hardware.

Furthermore, the components 802-816 of the assistive vector trace system 106 are implemented as one or more operating systems, as one or more stand-alone applications, as one or more modules of an application, as one or more plug-ins, as one or more library functions or functions called by other applications, and/or as a cloud-computing model. Thus, in some embodiments, the components 802-816 of the assistive vector trace system 106 are implemented as a stand-alone application, such as a desktop or mobile application. Furthermore, in some embodiments, the components 802-816 of the assistive vector trace system 106 are implemented as one or more web-based applications hosted on a remote server. Alternatively, or additionally, the components 802-816 of the assistive vector trace system 106 are implemented in a suite of mobile device applications or "apps."

For example, in one or more embodiments, the assistive vector trace system 106 comprises or operates in connection with digital software applications such as: ADOBE® PHOTOSHOP®, ADOBE® ILLUSTRATOR®, ADOBE® EXPRESS, ADOBE® XD, ADOBE® INDESIGN®, and ADOBE® CREATIVE CLOUD®. The foregoing are either registered trademarks or trademarks of Adobe Inc. in the United States and/or other countries.

Figure 9:
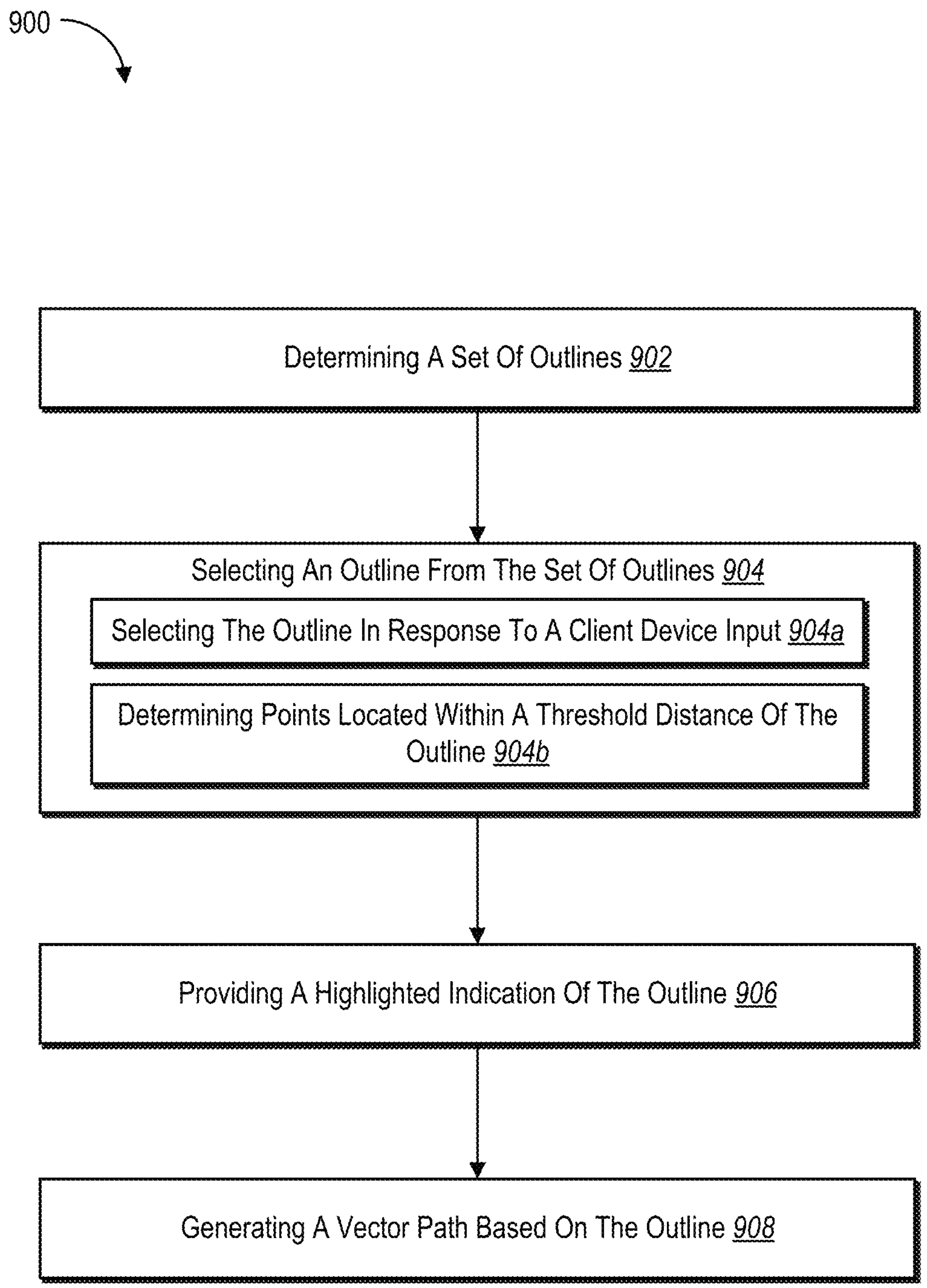
FIG. 9 illustrates a flowchart of a series of acts for generating assistive guides for creating a vector path in accordance with one or more embodiments.

FIGS. 1-8, the corresponding text, and the examples provide a number of different methods, systems, devices, and non-transitory computer-readable media of the assistive vector trace system 106. In addition to the foregoing, one or more embodiments are also described in terms of flowcharts comprising acts for accomplishing a particular result, as shown in FIG. 9. In some embodiments, the acts shown in FIG. 9 are performed in connection with more or fewer acts. Further, the acts may be performed in differing orders. Additionally, in various embodiments, the acts described herein are repeated or performed in parallel with one another or parallel with different instances of the same or similar acts. A non-transitory computer-readable medium includes instructions that, when executed by one or more processors, cause a computing device to perform the acts of FIG. 9. In some embodiments, a system is configured to perform the acts of FIG. 9. Alternatively, the acts of FIG. 9 are performed as part of a computer-implemented method.

FIG. 9 illustrates a flowchart of a series of acts 900 for modifying a digital document with an assistive vector trace system 106 in accordance with one or more embodiments. While FIG. 9 illustrates acts according to one embodiment, alternative embodiments omit, add to, reorder, and/or modify any acts shown in FIG. 9.

FIG. 9 illustrates an example series of acts 900 for utilizing an assistive vector trace system 106 to generate a vector path. In particular, in certain embodiments, the series of acts 900 includes an act 902 of determining a set of outlines. Specifically, in one or more embodiments, the act 902 includes determining a set of outlines corresponding to boundaries of a set of segments within a raster image. In particular, in certain embodiments, the series of acts 900 includes an act 904 of selecting an outline from the set of outlines, the sub-act 904*a* of selecting the outline in response to a client device input, and the sub-act 904*b* of determining points located within a threshold distance of the outline. In particular, in one or more embodiments, the act 904 includes selecting, from the set of outlines, an outline corresponding to a segment of the set of segments in response to a client device input indicating one or more points located within a threshold distance of the outline. As illustrated, in some embodiments, the series of acts 900 also includes an act 906 of providing a highlighted indication of the outline. In particular, in one or more embodiments, the act 906 includes providing, for display within a graphical user interface of a client device, a highlighted indication of the outline corresponding to the segment. Furthermore, in certain embodiments, the series of acts 900 includes an act 908 of generating a vector path based on the outline. Specifically, in one or more embodiments, the act 908 includes generating, within a vector image, a vector path based on the outline corresponding to the segment in response to a selection of the outline via the graphical user interface.

In addition (or in the alternative) to the acts described above, in certain embodiments, the assistive vector trace system series of acts 900 includes determining a first bounding box for the outline. In some embodiments, the series of acts 900 also includes determining a second bounding box for the client device input. Moreover, in one or more embodiments, the assistive vector trace system 106 series of acts 900 includes selecting the outline based on the first bounding box intersecting with the second bounding box. Further still, in some embodiments, the assistive vector trace system 106 series of acts 900 includes generating, utilizing an object detection model, an object mask for an object within the raster image utilizing semantic analysis. Furthermore, in one or more embodiments, the assistive vector trace system series of acts 900 includes generating, utilizing an object segmentation model, the set of segments within the raster image by segmenting the object based on the object mask.

Moreover, one or more embodiments, the series of acts 900 includes selecting, from the set of outlines, an additional outline corresponding to an additional segment of the set of segments in response to determining that the one or more points are located within the threshold distance of the additional outline. Further still, in one or more embodiments, the series of acts 900 includes providing, for display within the graphical user interface of the client device, an additional highlighted indication of the additional outline corresponding to the additional segment, wherein the additional highlighted indication is visually distinct from the highlighted indication of the outline. Moreover, in one or more embodiments, the series of acts 900 includes selecting the outline in response to utilizing a hit detection operation to determine that the one or more points of the client device input intersects with the outline.

In certain embodiments, the series of acts 900 further includes generating a binary mask for the segment. Moreover, one or more embodiments, the series of acts 900 includes extracting one or more contours from the binary mask to determine a boundary of the segment. Furthermore, in one or more embodiments, the series of acts 900 includes generating the outline comprising an outline polyline that corresponds to the one or more contours from the binary mask. Moreover, in one or more embodiments, the series of acts 900 includes generating an input polyline that corresponds to the one or more points of the client device input. In one or more embodiments, the series of acts 900 includes selecting the outline from the set of outlines based on a comparison of the input polyline and the outline polyline in relation to a match tolerance threshold. Further still, in one or more embodiments, the series of acts 900 includes removing redundant points within the outline polyline according to distances between points in the outline polyline utilizing an outline matching model.

Moreover, in one or more embodiments, the series of acts 900 includes determining, for a raster image, a first outline corresponding to a boundary of a first segment and a second outline corresponding to a boundary of a second segment. In one or more embodiments, the series of acts 900 further includes receiving, from a client device, a client device input indicating a point in the raster image within a threshold distance of the first segment and the second segment. In addition, in one or more embodiments, the series of acts 900 includes providing, for display within a graphical user interface of the client device, a first highlighted indication of the first outline and a second highlighted indication of the second outline in response to the client device input being within the threshold distance of the first segment and the second segment. Furthermore, in one or more embodiments, the series of acts 900 includes generating, within a vector image and based on a selection of the first outline, a vector path with a geometry associated with the first outline.

In addition, in one or more embodiments, the series of acts 900 includes receiving an additional client device input indicating an additional point in the raster image. Moreover, in one or more embodiments, the series of acts 900 includes determining that the first segment is not within the threshold distance of the additional point. In one or more embodiments, the series of acts 900 includes removing the first highlighted indication of the first outline from display within the graphical user interface. Furthermore, in one or more embodiments, the series of acts 900 includes determining that the first segment is outside the threshold distance of the additional point by utilizing a hit detection operation to restrict potential outlines and exclude the first segment.

In some embodiments, the series of acts 900 also includes receiving a supplementary client device input indicating removal of the additional point in the raster image. Moreover, in one or more embodiments, the assistive vector trace system 106 series of acts 900 includes providing, for display within the graphical user interface of the client device, the first highlighted indication of the first outline in response to the removal of the additional point in the raster image. Further still, in some embodiments, the assistive vector trace system 106 series of acts 900 includes generating an outline polyline comprising line primitives corresponding to the first outline. Furthermore, in one or more embodiments, the assistive vector trace system series of acts 900 includes removing redundant points within the outline polyline according to distances between points in the outline polyline.

Moreover, one or more embodiments, the series of acts 900 includes generating, utilizing an object detection model, a plurality of object masks for a plurality of objects within the raster image. Further still, in one or more embodiments, the series of acts 900 includes generating the first segment and the second segment within the raster image by: segmenting, utilizing an object segmentation model, an object based on a mask of the plurality of object masks to generate a set of segment masks; and generating a plurality of outlines based on contours extracted from the set of segment masks.

Moreover, in one or more embodiments, the series of acts 900 includes determining a first bounding box corresponding to the first outline. In certain embodiments, the series of acts 900 further includes determining a second bounding box corresponding to the second outline. Moreover, one or more embodiments, the series of acts 900 includes selecting the first outline and the second outline in response to determining that a third bounding box corresponding to the client device input intersects with the first bounding box and the second bounding box.

Furthermore, in one or more embodiments, the series of acts 900 includes segmenting one or more objects in a raster image into a set of segments utilizing an object segmentation model. Moreover, in one or more embodiments, the series of acts 900 includes generating a set of outlines corresponding to contours extracted from the set of segments. In one or more embodiments, the series of acts 900 includes selecting, from the set of outlines, an outline corresponding to a segment of the set of segments in response to a client device input drawing one or more points located within a threshold distance of the outline. Further still, in one or more embodiments, the series of acts 900 includes providing, for display within a graphical user interface of a client device, a highlighted indication of the outline corresponding to the segment. Moreover, in one or more embodiments, the series of acts 900 includes generating, within a vector image, a vector path based on the outline corresponding to the segment in response to a selection of the outline via the graphical user interface.

In one or more embodiments, the series of acts 900 further includes determining a modified client device input based on receiving an indication of a removal of a point from the one or more points. In addition, in one or more embodiments, the series of acts 900 includes selecting, from the set of outlines, an additional outline corresponding to an additional segment of the set of segments in response to the modified client device input being located within a threshold distance of the additional outline. Furthermore, in one or more embodiments, the series of acts 900 includes providing, for display within the graphical user interface of the client device, an additional highlighted indication of the additional outline. Moreover, one or more embodiments, the series of acts 900 includes determining an input spline corresponding to the client device input which comprises the one or more points. Further still, in one or more embodiments, the series of acts 900 includes generating an input polyline corresponding by reducing the input spline to line primitives. Moreover, in one or more embodiments, the series of acts 900 includes selecting the outline corresponding to the segment based on a comparison of the input polyline and the outline.

In certain embodiments, the series of acts 900 further includes determining a set of bounding boxes corresponding to the set of outlines. Moreover, one or more embodiments, the series of acts 900 includes determining an input bounding box corresponding to the client device input. Furthermore, in one or more embodiments, the series of acts 900 includes selecting a subset of the set of outlines based comprising a subset of bounding boxes of the set of bounding boxes that intersect with the input bounding box. Moreover, in one or more embodiments, the series of acts 900 includes selecting the outline from the subset of the set of outlines. In one or more embodiments, the series of acts 900 includes generating a dilated input by dilating the client device input by a pixel amount. Further still, in one or more embodiments, the series of acts 900 includes selecting the outline in response to determining an intersection of the dilated input with the outline.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
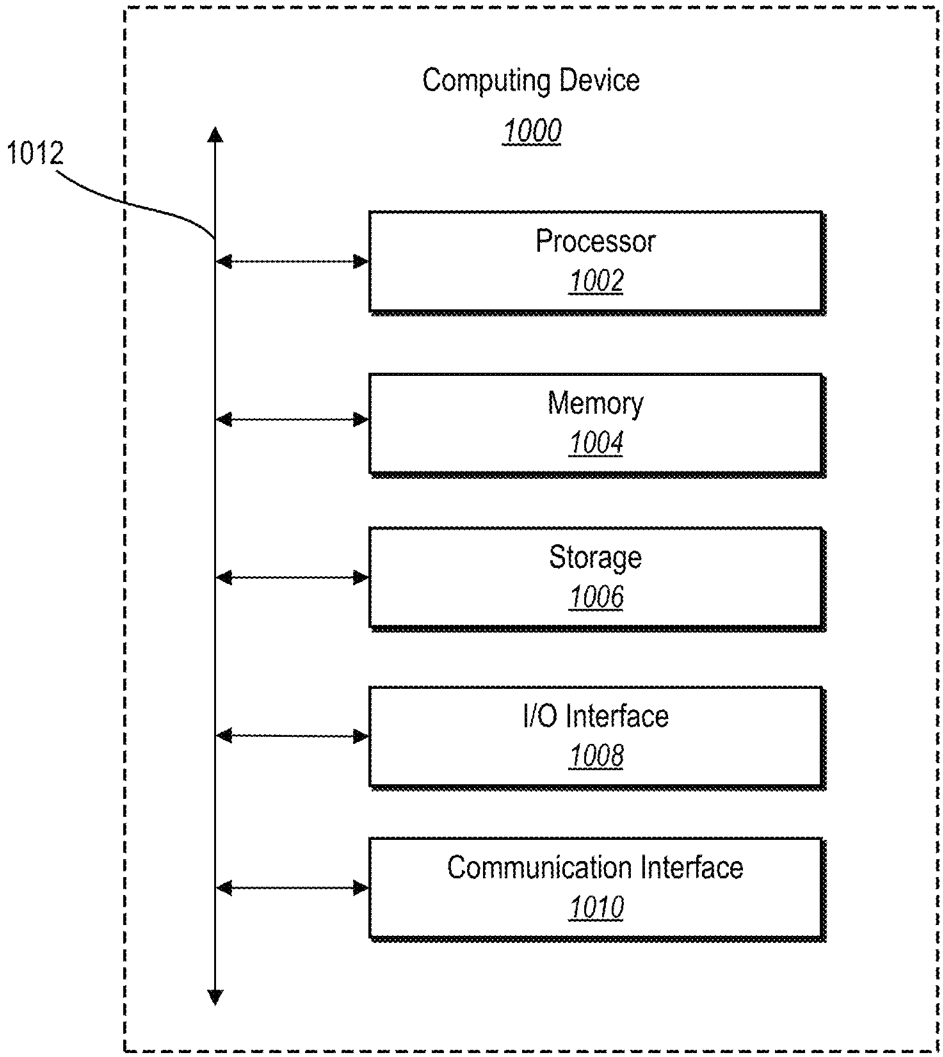
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., server device(s) 102, client device(s) 110, and computing device 1000). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
determining a set of outlines corresponding to boundaries of a set of segments within a raster image;
selecting, from the set of outlines, an outline corresponding to a segment of the set of segments in response to a client device input indicating one or more points located within a threshold distance of the outline;
providing, for display within a graphical user interface of a client device, a highlighted indication of the outline corresponding to the segment; and
partially vectorizing the raster image by selectively generating a vector path based on the outline corresponding to the segment in response to a selection of the highlighted indication of the outline via the graphical user interface.

2. The computer-implemented method of claim 1, wherein selecting the outline comprises:
determining a first bounding box for the outline;
determining a second bounding box for the client device input; and
selecting the outline based on the first bounding box intersecting with the second bounding box.

3. The computer-implemented method of claim 1, further comprising:
generating, utilizing an object detection model, an object mask for an object within the raster image utilizing semantic analysis; and
generating, utilizing an object segmentation model, the set of segments within the raster image by segmenting the object based on the object mask.

4. The computer-implemented method of claim 1, further comprising:
selecting, from the set of outlines, an additional outline corresponding to an additional segment of the set of segments in response to determining that the one or more points are located within the threshold distance of the additional outline; and
providing, for display within the graphical user interface of the client device, an additional highlighted indication of the additional outline corresponding to the additional segment, wherein the additional highlighted indication is visually distinct from the highlighted indication of the outline.

5. The computer-implemented method of claim 1, wherein selecting the outline comprises selecting the outline in response to utilizing a hit detection operation to determine that the one or more points of the client device input intersects with the outline.

6. The computer-implemented method of claim 1, wherein determining the set of outlines comprises:
generating a binary mask for the segment;
extracting one or more contours from the binary mask to determine a boundary of the segment; and
generating the outline comprising an outline polyline that corresponds to the one or more contours from the binary mask.

7. The computer-implemented method of claim 6, wherein selecting the outline comprises:
generating an input polyline that corresponds to the one or more points of the client device input; and
selecting the outline from the set of outlines based on a comparison of the input polyline and the outline polyline in relation to a match tolerance threshold.

8. The computer-implemented method of claim 6, further comprising removing redundant points within the outline polyline according to distances between points in the outline polyline utilizing an outline matching model.

9. A system comprising:
one or more memory devices; and
one or more processors configured to cause the system to:
determine, for a raster image, a first outline corresponding to a boundary of a first segment and a second outline corresponding to a boundary of a second segment;
receive, from a client device, a client device input indicating a point in the raster image within a threshold distance of the first segment and the second segment;
provide, for display within a graphical user interface of the client device, a first highlighted indication of the first outline and a second highlighted indication of the second outline in response to the client device input being within the threshold distance of the first segment and the second segment; and
partially vectorize the raster image by selectively generating, based on a selection of the first highlighted indication of the first outline, a vector path with a geometry associated with the first outline.

10. The system of claim 9, wherein the one or more processors are further configured to cause the system to:
receive an additional client device input indicating an additional point in the raster image;
determine that the first segment is not within the threshold distance of the additional point; and
remove the first highlighted indication of the first outline from display within the graphical user interface.

11. The system of claim 10, wherein the one or more processors are further configured to determine that the first segment is outside the threshold distance of the additional point by utilizing a hit detection operation to restrict outlines and exclude the first segment.

12. The system of claim 10, wherein the one or more processors are further configured to:
receive a supplementary client device input indicating removal of the additional point in the raster image; and
provide, for display within the graphical user interface of the client device, the first highlighted indication of the first outline in response to the removal of the additional point in the raster image.

13. The system of claim 9, wherein the one or more processors are further configured to selectively generate the vector path by:
generating an outline polyline comprising line primitives corresponding to the first outline; and
removing redundant points within the outline polyline according to distances between points in the outline polyline.

14. The system of claim 9, wherein the one or more processors are further configured to:
generate, utilizing an object detection model, a plurality of object masks for a plurality of objects within the raster image; and
generate the first segment and the second segment within the raster image by:

segmenting, utilizing an object segmentation model, an object based on a mask of the plurality of object masks to generate a set of segment masks; and generating a plurality of outlines based on contours extracted from the set of segment masks.

15. The system of claim 9, wherein the one or more processors are further configured to select the first outline and the second outline by:

determining a first bounding box corresponding to the first outline;

determining a second bounding box corresponding to the second outline; and selecting the first outline and the second outline in response to determining that a third bounding box corresponding to the client device input intersects with the first bounding box and the second bounding box.

16. A non-transitory computer readable medium storing executable instructions which, when executed by a processing device, cause the processing device to perform operations comprising:

segmenting one or more objects in a raster image into a set of segments utilizing an object segmentation model;

generating a set of outlines corresponding to contours extracted from the set of segments;

selecting, from the set of outlines, an outline corresponding to a segment of the set of segments in response to a client device input drawing one or more points located within a threshold distance of the outline;

providing, for display within a graphical user interface of a client device, a highlighted indication of the outline corresponding to the segment; and partially vectorizing the raster image by selectively generating a vector path based on the outline corresponding to the segment in response to a selection of the highlighted indication of the outline via the graphical user interface.

17. The non-transitory computer readable medium of claim 16, further comprising:

determining a modified client device input based on receiving an indication of a removal of a point from the one or more points;

selecting, from the set of outlines, an additional outline corresponding to an additional segment of the set of segments in response to the modified client device input being located within a threshold distance of the additional outline; and providing, for display within the graphical user interface of the client device, an additional highlighted indication of the additional outline.

18. The non-transitory computer readable medium of claim 16, wherein selecting the outline comprises:

determining an input spline corresponding to the client device input which comprises the one or more points;

generating an input polyline corresponding by reducing the input spline to line primitives; and selecting the outline corresponding to the segment based on a comparison of the input polyline and the outline.

19. The non-transitory computer readable medium of claim 16, wherein selecting the outline comprises:

determining a set of bounding boxes corresponding to the set of outlines;

determining an input bounding box corresponding to the client device input;

selecting a subset of the set of outlines based comprising a subset of bounding boxes of the set of bounding boxes that intersect with the input bounding box; and selecting the outline from the subset of the set of outlines.

20. The non-transitory computer readable medium of claim 19, wherein selecting the outline from the subset of the set of outlines comprises:

generating a dilated input by dilating the client device input by a pixel amount; and selecting the outline in response to determining an intersection of the dilated input with the outline.

* * * * *